United States Patent
Byrne et al.

(10) Patent No.: US 8,616,126 B2
(45) Date of Patent: *Dec. 31, 2013

(54) APPARATUS FOR APPLYING INDICIA HAVING A LARGE COLOR GAMUT ON WEB SUBSTRATES

(75) Inventors: Thomas Timothy Byrne, West Chester, OH (US); André Mellin, Amberley Village, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/040,311

(22) Filed: Mar. 4, 2011

(65) Prior Publication Data

US 2012/0222571 A1  Sep. 6, 2012

(51) Int. Cl.
*B41F 9/02* (2006.01)
*B41F 31/22* (2006.01)

(52) U.S. Cl.
USPC ........... 101/119; 101/115; 101/151; 101/152; 101/174; 101/175

(58) Field of Classification Search
CPC ............ B41F 9/02; B41F 9/061; B41F 31/22; B41F 13/11; B41F 17/26; B41F 17/14
USPC .................. 101/151, 152, 115, 174, 175, 119
See application file for complete search history.

(56) References Cited

U.S. PATENT DOCUMENTS

| | | |
|---|---|---|
| 1,867,314 A | 7/1932 | Gurwick |
| 2,226,163 A | 12/1940 | DuFour |
| 2,427,765 A | 9/1947 | Chollar |
| 2,468,400 A | 4/1949 | Huebner |
| 2,864,310 A | 12/1958 | Nelson |
| 3,055,296 A | 9/1962 | Farrow |
| 3,056,384 A | 10/1962 | Beale |
| 3,294,016 A | 12/1966 | Heonis |
| 3,301,746 A | 1/1967 | Sanford et al. |
| 3,473,576 A | 10/1969 | Amneus |
| 3,573,164 A | 3/1971 | Friedberg et al. |
| 3,635,195 A * | 1/1972 | Levy .............................. 399/244 |
| 3,738,269 A | 6/1973 | Wagner |
| 3,821,068 A | 6/1974 | Shaw |
| 3,896,722 A | 7/1975 | Farrow |
| 3,896,723 A | 7/1975 | Farrow et al. |
| 3,974,025 A | 8/1976 | Ayers |
| 3,994,771 A | 11/1976 | Morgan, Jr. et al. |
| 4,033,258 A | 7/1977 | Farrow |
| 4,191,609 A | 3/1980 | Trokhan |

(Continued)

FOREIGN PATENT DOCUMENTS

| EP | 1 075 948 B1 | 9/2005 |
|---|---|---|
| EP | 1 673 225 B1 | 8/2008 |

(Continued)

*Primary Examiner* — Daniel J Colilla
*Assistant Examiner* — Blake A Tankersley
(74) *Attorney, Agent, or Firm* — Peter D. Meyer

(57) ABSTRACT

A contact printing system is disclosed. The contact printing system is provided with a central roll having a plurality of discrete cells disposed upon an outer surface thereof. Each of the plurality of discrete cells is in fluidic communication with a respective fluid delivery channel. Each of the fluid delivery channels are formed in situ with the formation of the central roll and the plurality of cells.

14 Claims, 16 Drawing Sheets

Fig. 9

(56) References Cited

U.S. PATENT DOCUMENTS

| | | | |
|---|---|---|---|
| 4,191,756 A | 3/1980 | Masi et al. | |
| 4,239,065 A | 12/1980 | Trokhan | |
| 4,300,981 A | 11/1981 | Carstens | |
| 4,361,089 A | 11/1982 | Wittkopf et al. | |
| 4,437,408 A | 3/1984 | Arkans | |
| 4,440,597 A | 4/1984 | Wells et al. | |
| 4,452,141 A | 6/1984 | Mistyurik | |
| 4,458,399 A | 7/1984 | Kessler | |
| 4,483,053 A | 11/1984 | Hamisch, Jr. | |
| 4,526,098 A * | 7/1985 | Bachman | 101/115 |
| 4,528,239 A | 7/1985 | Trokhan | |
| 4,529,480 A | 7/1985 | Trokhan | |
| 4,534,094 A | 8/1985 | Kessler | |
| 4,574,732 A | 3/1986 | Verwey et al. | |
| 4,599,627 A | 7/1986 | Vollert | |
| 4,637,859 A | 1/1987 | Trokhan | |
| 4,766,840 A | 8/1988 | Beckley et al. | |
| 4,785,733 A * | 11/1988 | Hartung et al. | 101/181 |
| 4,812,899 A | 3/1989 | Kueppers | |
| 4,844,952 A | 7/1989 | Korenkiewicz et al. | |
| 4,878,977 A | 11/1989 | Kueppers | |
| 4,939,992 A | 7/1990 | Bird | |
| 5,082,703 A | 1/1992 | Longobardi | |
| 5,282,419 A | 2/1994 | Barrois | |
| 5,364,504 A | 11/1994 | Smurkoski et al. | |
| 5,429,686 A | 7/1995 | Chiu et al. | |
| 5,458,590 A | 10/1995 | Schleinz et al. | |
| 5,529,664 A | 6/1996 | Trokhan et al. | |
| 5,549,790 A | 8/1996 | Van Phan | |
| 5,556,509 A | 9/1996 | Trokhan et al. | |
| 5,580,423 A | 12/1996 | Ampulski et al. | |
| 5,609,725 A | 3/1997 | Van Phan | |
| 5,629,052 A | 5/1997 | Trokhan et al. | |
| 5,637,194 A | 6/1997 | Ampulski et al. | |
| 5,672,248 A | 9/1997 | Wendt et al. | |
| 5,674,663 A | 10/1997 | McFarland et al. | |
| 5,679,222 A | 10/1997 | Rasch et al. | |
| 5,693,187 A | 12/1997 | Ampulski et al. | |
| 5,695,855 A | 12/1997 | Yeo et al. | |
| 5,709,775 A | 1/1998 | Trokhan et al. | |
| 5,714,041 A | 2/1998 | Ayers et al. | |
| 5,733,634 A | 3/1998 | Karel | |
| 5,734,800 A | 3/1998 | Herbert et al. | |
| 5,776,307 A | 7/1998 | Ampulski et al. | |
| 5,795,440 A | 8/1998 | Ampulski et al. | |
| 5,814,190 A | 9/1998 | Van Phan | |
| 5,817,377 A | 10/1998 | Trokhan et al. | |
| 5,846,379 A | 12/1998 | Ampulski et al. | |
| 5,855,739 A | 1/1999 | Ampulski et al. | |
| 5,858,514 A | 1/1999 | Bowers | |
| 5,861,082 A | 1/1999 | Ampulski et al. | |
| 5,865,950 A | 2/1999 | Vinson et al. | |
| 5,871,887 A | 2/1999 | Trokhan et al. | |
| 5,897,745 A | 4/1999 | Ampulski et al. | |
| 5,904,811 A | 5/1999 | Ampulski et al. | |
| 5,906,161 A | 5/1999 | Kessler | |
| 5,906,710 A | 5/1999 | Trokhan | |
| 5,942,085 A | 8/1999 | Neal et al. | |
| 6,048,938 A | 4/2000 | Neal et al. | |
| 6,096,412 A | 8/2000 | McFarland et al. | |
| 6,173,646 B1 | 1/2001 | Tanaka et al. | |
| 6,187,138 B1 | 2/2001 | Neal et al. | |
| 6,234,078 B1 | 5/2001 | Kessler | |
| 6,281,269 B1 | 8/2001 | Schut | |
| 6,477,948 B1 | 11/2002 | Nissing et al. | |
| 6,610,131 B2 | 8/2003 | Harris et al. | |
| 6,993,964 B2 | 2/2006 | Franz et al. | |
| 7,611,582 B2 | 11/2009 | McNeil et al. | |
| 8,163,132 B2 | 4/2012 | Kien | |
| 2006/0008514 A1 | 1/2006 | Koenig et al. | |

FOREIGN PATENT DOCUMENTS

| | | |
|---|---|---|
| GB | 1176321 | 1/1970 |
| GB | 1241793 | 8/1971 |
| GB | 1241794 | 8/1971 |
| GB | 1350059 | 4/1974 |
| GB | 1396282 | 6/1975 |
| GB | 1439458 | 6/1976 |
| GB | 1468360 | 3/1977 |
| GB | 1570545 | 7/1980 |
| GB | 2314292 | 12/1997 |
| WO | WO 84/00516 | 2/1984 |
| WO | WO 99/54143 | 10/1999 |

* cited by examiner

APPARATUS FOR APPLYING INDICIA HAVING A LARGE COLOR GAMUT ON WEB SUBSTRATES

FIELD OF THE INVENTION

The present disclosure provides an apparatus suitable for use in printing graphics and other indicia upon a web substrate. More particularly, the present disclosure provides an internally fed gravure printing apparatus suitable for use in printing graphics and their indicia upon web substrates.

BACKGROUND OF THE INVENTION

Contact printing, such as Gravure printing, is an industrial printing process mainly used for the high speed production of large print runs at constant speed and high quality. It is understood that the gravure process is utilized to print millions of magazines each week, as well as mail order catalogues and other printed products that require constant print quality that must look attractive and also demonstrate exactly what they offer. Examples of contact printed products include art books, greeting cards, advertising, currency, stamps, wallpaper, wrapping paper, magazines, wood laminates, and some packaging.

Gravure printing, a de-facto sub-set of contact printing, is a direct printing process that uses a type of image carrier called intaglio. Intaglio means the printing plate, in cylinder form, is recessed and consists of cell wells that are etched or engraved to differing depths and/or sizes. These cylinders are usually made of steel and plated with copper and a light sensitive coating. After being treated, the gravure cylinder is usually machined to remove imperfections in the copper.

Most gravure cylinders are now laser engraved. In the past, gravure rolls were either engraved using a diamond stylus or chemically etched using ferric chloride. If the cylinder was chemically etched, a resist (in the form of a negative image) was transferred to the cylinder before etching. The resist protects the non-image areas of the cylinder from the etchant. After etching, the resist is stripped off. Typically, following the engraving process, the cylinder is proofed and tested, reworked if necessary, and then chrome plated. Today, corrections to laser engraved gravure cylinders are performed using the old chemical etching process.

As shown in FIG. 1, contact printing systems using direct image carriers, such as gravure cylinders, apply an ink directly to the gravure cylinder (also known as a central roll). From the gravure cylinder, the ink is transferred to the substrate. Modern gravure presses have at least two gravure cylinders 100, 100A that rotate in a respective ink bath 118, 118A where each cell of the design imposed upon the surface of the gravure cylinders 100, 100A is flooded with ink. A system called a doctor blade 106, 106A is angled against the gravure cylinder 100, 100A to wipe away the excess ink leaving ink only in the cell wells of each respective gravure cylinder 100, 100A. The doctor blade 106, 106A is normally positioned as close as possible to the nip point of the substrate 100 meeting the respective gravure cylinder 100, 100A. This is done so ink in the cells of the gravure cylinder 100, 100A has less time to dry out before it meets the substrate via the respective impression rollers 102, 102A. The capillary action of the substrate 110 and the pressure from the impression rollers 102, 102A draw and/or force the ink out of the cell cavity of the gravure roll 100, 100A and transfer it to the substrate 110.

What is important to understand is that typical gravure systems provide for a plurality of individual gravure stations where each gravure cylinder supplies an individual ink to the web substrate 110. Thus, in order to provide a finally printed product 112, 114, 116 having eight colors, a gravure printing system will require eight individual gravure stations. Similarly, a finally printed product 112, 114, 116 having five colors would require a gravure printing system having five individual gravure stations. Sequentially, a web substrate 110 will pass between a first gravure cylinder and a first impression cylinder 102 which transfers a first ink to the web substrate 110 which is then dried in a dryer 104 prior to application of a second ink from the combination of a second gravure cylinder 100A and second impression cylinder 102A. The subsequent printed product is then dried in a second dryer 104A and subsequently converted into a final product in the form of a convolutely wound roll 116, a folded product 114, or a stack of individual products 112.

It should also be noted that it is required that the ink applied to the web substrate 110 is dried before the web substrate 110 reaches the next printing station of the gravure system. This is necessary because wet inks cannot be overprinted without smearing and smudging. This emphasizes the need for high volume drying equipment such as dryers 104, 104A to be placed after each gravure printing station.

The printing impression provided to web substrate 110 and produced by the gravure processes are accomplished by the transfer of ink from cells of various sizes and depths that are etched onto the gravure cylinder 100, 100A as shown in FIGS. 2A-2C. The respective cells 120A, 120B, 120C can be provided in different sizes and depths, and the gravure cylinder 100, 100A may contain as many as 22,500 cells per square inch. The various sizes and depths of the depressions of the cells 120A, 120B, 120C create the different densities of the image. A larger or deeper depression transfers more ink to the printing surface on web substrate 110, thereby creating a larger and/or darker area. The regions upon gravure cylinders 100, 100A that are not etched become non-image areas. Further, the cells 120A-120C that are engraved into the gravure cylinders 100, 100A can be different in area and depth, or they can be the same depth but different in area. This can allow for greater flexibility in producing high quality work for different types of applications. Cells 120A-120C that vary in area but are of equal depth are often used on gravure cylinders 100, 100A for printing packaging applications. Gravure cylinders 100, 100A with cells 120A-120C that vary in area and depth are typically reserved for high quality printing. It is understood that printed images produced with gravure are high quality because the thousands of ink cells 120A-120C appear to merge into a continuous tone image.

Besides being very thin and fluid, the ink colors used with the gravure process color applications typically differ in hue than the inks used with other printing processes. Instead of the usual cyan, magenta, yellow, and black hues used with offset lithography, blue, red, yellow, and black are typically used. Standards have been established by the Gravure Association of America for the correct types of inks and colors that should be used for the different types of substrates and printing applications.

However, as can be seen, the gravure process can be costly and requires numerous gravure printing stations in order to provide a web substrate with several colors and images that require a large gamut. As mentioned previously, providing an image onto a web substrate that has eight colors typically requires eight gravure print stations. The gravure apparatus is costly to produce due to the nature of producing the individual gravure rolls. Additionally, the ancillary equipment required by the gravure process (e.g., doctor blades, impression cylinders, and dryers) adds to the cost of a single gravure station.

Multiply this cost over the need to produce high definition, high quality, and multi-color images running a large color gamut increases the associated equipment costs accordingly. Further, the floor space footprint of a single gravure station is typically quite significant. If this is multiplied by the several stations required to print several colors onto a web substrate, the amount of floor space required is accordingly increased.

Thus, it would be advantageous to not only provide a contact printing system such as a gravure printing system that can provide the application of several different inks onto a single web substrate with a single gravure roll but also reduce the floor space required for such a printing system.

SUMMARY OF THE INVENTION

The contact printing system of the present disclosure is provided with a central roll having a plurality of discrete cells disposed upon an outer surface thereof. Each of the plurality of discrete cells is in fluidic communication with a respective fluid delivery channel. Each of the fluid delivery channels are formed in situ with the formation of the central roll and the plurality of cells.

DETAILED DESCRIPTION OF THE INVENTION

Figure 1:
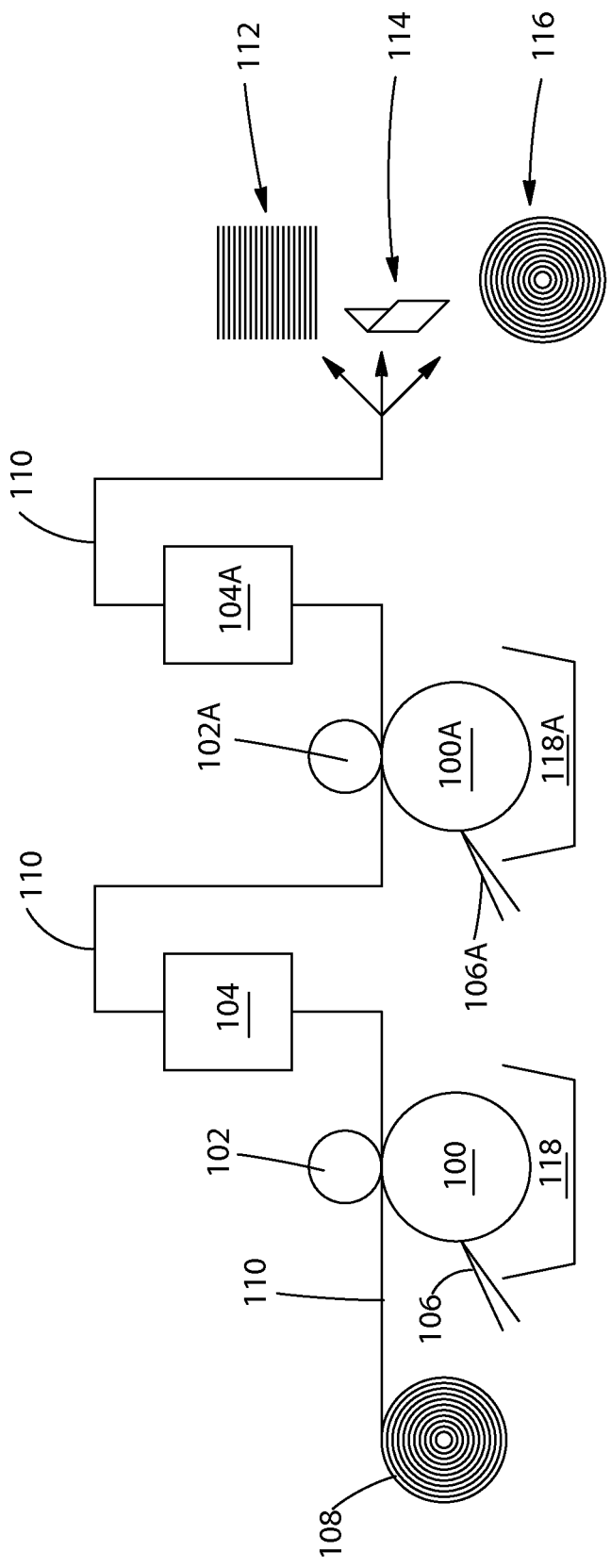
FIG. 1 is a schematic view of a prior art representation of an exemplary gravure printing system having two stations.
Figure 2A:
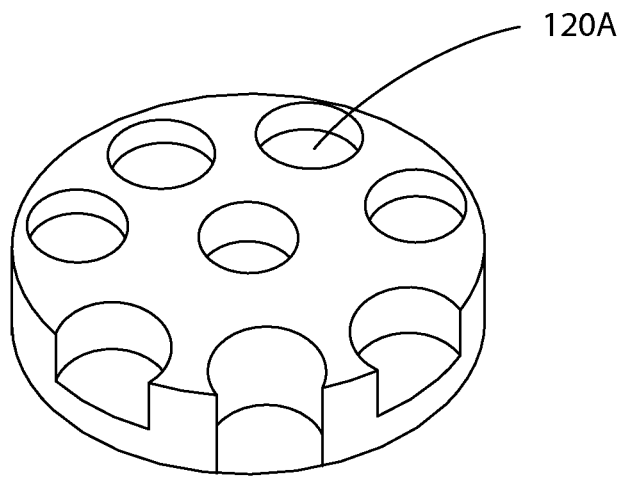
FIGS. 2A-2C are expanded views of exemplary sections of a typical gravure cylinder depicting the various sizes, shapes, and depths of the cells formed on the surface of the gravure cylinder known in the prior art.
Figure 2B:
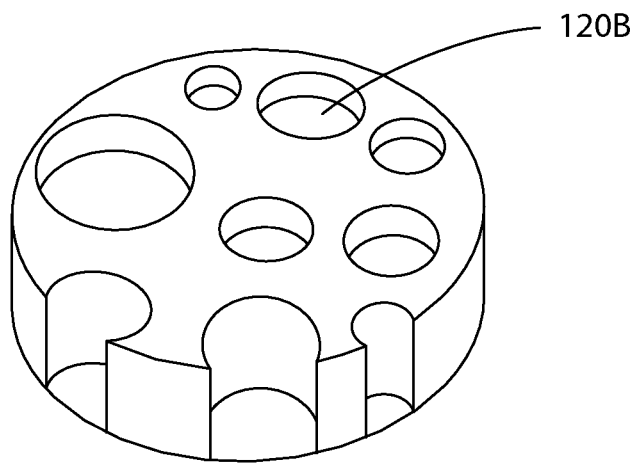
Figure 2C:
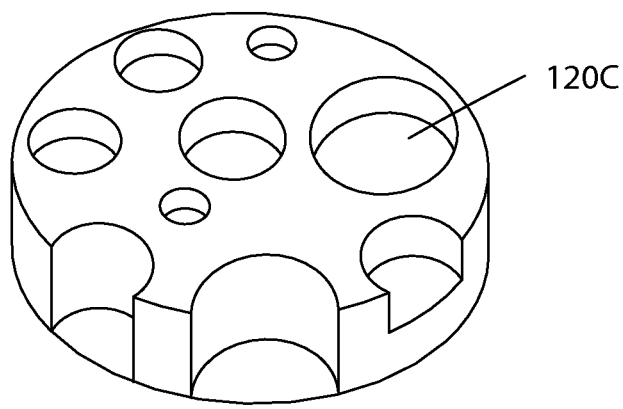

"Absorbent paper product," as used herein, refers to products comprising paper tissue or paper towel technology in general, including, but not limited to, conventional felt-pressed or conventional wet-pressed fibrous structure product, pattern densified fibrous structure product, starch substrates, and high bulk, uncompacted fibrous structure product. Non-limiting examples of tissue-towel paper products include disposable or reusable, toweling, facial tissue, bath tissue, and the like. In one non-limiting embodiment, the absorbent paper product is directed to a paper towel product. In another non-limiting embodiment, the absorbent paper product is directed to a rolled paper towel product. One of skill in the art will appreciate that in one embodiment an absorbent paper product may have CD and/or MD modulus properties and/or stretch properties that are different from other printable substrates, such as card paper. Such properties may have important implications regarding the absorbency and/or roll-ability of the product. Such properties are described in greater detail infra.

In one embodiment, an absorbent paper product substrate may be manufactured via a wet-laid paper making process. In other embodiments, the absorbent paper product substrate may be manufactured via a through-air-dried paper making process or foreshortened by creping or by wet micro-contraction. In some embodiments, the resultant paper product plies may be differential density fibrous structure plies, wet laid fibrous structure plies, air laid fibrous structure plies, conventional fibrous structure plies, and combinations thereof. Creping and/or wet micro-contraction are disclosed in U.S. Pat. Nos. 6,048,938, 5,942,085, 5,865,950, 4,440,597, 4,191,756, and 6,187,138.

In an embodiment, the absorbent paper product may have a texture imparted into the surface thereof wherein the texture is formed into product during the wet-end of the papermaking process using a patterned papermaking belt. Exemplary processes for making a so-called pattern densified absorbent paper product include, but are not limited, to those processes disclosed in U.S. Pat. Nos. 3,301,746, 3,974,025, 4,191,609, 4,637,859, 3,301,746, 3,821,068, 3,974,025, 3,573,164, 3,473,576, 4,239,065, and 4,528,239.

In other embodiments, the absorbent paper product may be made using a through-air-dried (TAD) substrate. Examples of, processes to make, and/or apparatus for making through air dried paper are described in U.S. Pat. Nos. 4,529,480, 4,529,480, 4,637,859, 5,364,504, 5,529,664, 5,679,222, 5,714,041, 5,906,710, 5,429,686, and 5,672,248.

In other embodiments still, the absorbent paper product substrate may be conventionally dried with a texture as is described in U.S. Pat. Nos. 5,549,790, 5,556,509, 5,580,423, 5,609,725, 5,629,052, 5,637,194, 5,674,663, 5,693,187, 5,709,775, 5,776,307, 5,795,440, 5,814,190, 5,817,377, 5,846,379, 5,855,739, 5,861,082, 5,871,887, 5,897,745, and 5,904,811.

"Base Color," as used herein, refers to a color that is used in the halftoning printing process as the foundation for creating additional colors. In some non-limiting embodiments, a base color is provided by a colored ink and/or dye. Non-limiting examples of base colors may selected from the group consisting of: cyan, magenta, yellow, black, red, green, and blue-violet.

"Basis Weight", as used herein, is the weight per unit area of a sample reported in lbs/3000 ft$^2$ or g/m$^2$.

"Black", as used herein, refers to a color and/or base color which absorbs wavelengths in the entire spectral region of from about 380 nm to about 740 nm.

"Blue" or "Blue-violet", as used herein, refers to a color and/or base color which have a local maximum reflectance in the spectral region of from about 390 nm to about 490 nm.

"Cyan", as used herein, refers to a color and/or base color which have a local maximum reflectance in the spectral region of from about 390 nm to about 570 nm. In some embodiments, the local maximum reflectance is between the local maximum reflectance of the blue or blue-violet and green local maxima.

"Cross Machine Direction" or "CD", as used herein, means the direction perpendicular to the machine direction in the same plane of the fibrous structure and/or fibrous structure product comprising the fibrous structure.

"Dot gain" is a phenomenon in printing which causes printed material to look darker than intended. It is caused by halftone dots growing in area between the original image ("input halftone") and the image finally printed upon the web material ("output halftone").

A "dye" is a liquid containing coloring matter, for imparting a particular hue to cloth, paper, etc. For purposes of clarity, the terms "fluid" and/or "ink" and/or "dye" may be used interchangeably herein and should not be construed as limiting any disclosure herein to solely a "fluid" and/or "ink" and/or "dye."

"Fiber" means an elongate particulate having an apparent length greatly exceeding its apparent width. More specifically, and as used herein, fiber refers to such fibers suitable for a papermaking process. The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps; mechanical pulps including groundwood, thermomechanical pulp; chemithermomechanical pulp; chemically modified pulps, and the like. Chemical pulps, however, may be preferred in tissue towel embodiments since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from non-wood pulp such as cotton linters, bagesse, and the like, can be used. Additionally, fibers derived from recycled paper, which may contain any or all of the pulp categories listed above, as well as other non-fibrous materials such as fillers and adhesives used to manufacture the original paper product may be used in the present web.

In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, lyocel, polyester, polyethylene, and polypropylene fibers can be used within the scope of the present invention. Further, such fibers may be latex bonded.

"Fibrous structure," as used herein, means an arrangement of fibers produced in any papermaking machine known in the art to create a ply of paper product or absorbent paper product. Other materials are also intended to be within the scope of the present invention as long as they do not interfere or counter act any advantage presented by the instant invention. Suitable materials may include foils, polymer sheets, cloth, wovens or nonwovens, paper, cellulose fiber sheets, co-extrusions, laminates, high internal phase emulsion foam materials, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Such materials can be homogeneous or composition combinations.

A "fluid" is a substance, as a liquid or gas, that is capable of flowing and that changes its shape at a steady rate when acted upon by a force tending to change its shape. Exemplary fluids suitable for use with the present disclosure includes inks; dyes; softening agents; cleaning agents; dermatological solutions; wetness indicators; adhesives; botanical compounds (e.g., described in U.S. Patent Publication No. US 2006/0008514); skin benefit agents; medicinal agents; lotions; fabric care agents; dishwashing agents; carpet care agents; surface care agents; hair care agents; air care agents; actives comprising a surfactant selected from the group consisting of: anionic surfactants, cationic surfactants, nonionic surfactants, zwitterionic surfactants, and amphoteric surfactants; antioxidants; UV agents; dispersants; disintegrants; antimicrobial agents; antibacterial agents; oxidizing agents; reducing agents; handling/release agents; perfume agents; perfumes; scents; oils; waxes; emulsifiers; dissolvable films; edible dissolvable films containing drugs, pharmaceuticals and/or flavorants. Suitable drug substances can be selected from a variety of known classes of drugs including, for example, analgesics, anti-inflammatory agents, anthelmintics, antiarrhythmic agents, antibiotics (including penicillin), anticoagulants, antidepressants, antidiabetic agents, antipileptics, antihistamines, antihypertensive agents, antimuscarinic agents, antimycobacterial agents, antineoplastic agents, immunosuppressants, antithyroid agents, antiviral agents, anxiolytic sedatives (hypnotics and neuroleptics), astringents, beta-adrenoceptor blocking agents, blood products and substitutes, cardiac inotropic agents, corticosteroids, cough suppressants (expectorants and mucolytics), diagnostic agents, diuretics, dopaminergics (antiparkinsonian agents), haemostatics, immunological agents, lipid regulating agents, muscle relaxants, parasympathomimetics, parathyroid calcitonin and biphosphonates, prostaglandins, radiopharmaceuticals, sex hormones (including steroids), anti-allergic agents, stimulants and anorexics, synpathomimetics, thyroid agents, PDE IV inhibitors, NK3 inhibitors, CSBP/RK/p38 inhibitors, antipsychotics, vasodilators and xanthines; and combinations thereof.

A fluid suitable for use herein may be opaque, translucent, and/or transparent. An opaque fluid transmits no light, and therefore reflects, scatters, or absorbs all of it (e.g., the ultraviolet, visible, and infra-red spectra). A translucent (or translucid) fluid only allows light to pass through diffusely. A transparent (a pellucid or diaphanous) fluid has the physical property of allowing light to completely pass through.

"Green", as used herein, refers to a color and/or base color which have a local maximum reflectance in the spectral region of from about 491 nm to about 570 nm.

"Halftoning," as used herein, sometimes known to those of skill in the printing arts as "screening," is a printing technique that allows for less-than-full saturation of the primary colors. In halftoning, relatively small dots of each primary color are printed in a pattern small enough such that the average human observer perceives a single color. For example, magenta printed with a 20% halftone will appear to the average observer as the color pink. The reason for this is because, without wishing to be limited by theory, the average observer may perceive the tiny magenta dots and white paper between the dots as lighter, and less saturated, than the color of pure magenta ink.

"Hue" is the relative red, yellow, green, and blue-violet in a particular color. A ray can be created from the origin to any color within the two-dimensional a*b* space. Hue is the angle measured from 0° (the positive a* axis) to the created ray. Hue can be any value of between 0° to 360°. Lightness is determined from the L* value with higher values being more white and lower values being more black.

An "ink" is a fluid or viscous substance used for writing or printing.

"Lab Color" or "L*a*b* Color Space," as used herein, refers to a color model that is used by those of skill in the art to characterize and quantitatively describe perceived colors with a relatively high level of precision. More specifically, CIELab may be used to illustrate a gamut of color because L*a*b* color space has a relatively high degree of perceptual uniformity between colors. As a result, L*a*b* color space may be used to describe the gamut of colors that an ordinary observer may actually perceive visually.

A color's identification is determined according to the Commission Internationale de l'Eclairage L*a*b* Color Space (hereinafter "CIELab"). CIELab is a mathematical color scale based on the Commission Internationale de l'Eclairage (hereinafter "CIE") 1976 standard. CIELab allows a color to be plotted in a three-dimensional space analogous to the Cartesian xyz space. Any color may be plotted in CIELab according to the three values (L*, a*, b*). For example, there is an origin with two axis a* and b* that are coplanar and perpendicular, as well as an L-axis which is perpendicular to the a* and b* axes, and intersects those axes only at the origin. A negative a* value represents green and a positive a* value represents red. CIELab has the colors blue-violet to yellow on what is traditionally the y-axis in Cartesian xyz space. CIELab identifies this axis as the b*-axis. Negative b* values represent blue-violet and positive b* values represent yellow. CIELab has lightness on what is traditionally the z-axis in Cartesian xyz space. CIELab identifies this axis as the L-axis. The L*-axis ranges in value from 100, which is white, to 0, which is black. An L* value of 50 represents a mid-tone gray (provided that a* and b* are 0). Any color may be plotted in CIELab according to the three values (L*, a*, b*). As described supra, equal distances in CIELab space correspond to approximately uniform changes in perceived color. As a result, one of skill in the art is able to approximate perceptual differences between any two colors by treating each color as a different point in a three dimensional, Euclidian, coordinate system, and calculating the Euclidian distance between the two points ($\Delta E^*_{ab}$).

The three dimensional CIELab allows the three color components of chroma, hue, and lightness to be calculated. Within the two-dimensional space formed from the a-axis and b-axis, the components of hue and chroma can be determined. Chroma is the relative saturation of the perceived color and is determined by the distance from the origin as measured in the a*b* plane. Chroma, for a particular (a*, b*) can be calculated as follows:

$$C^* = (a^{*2} + b^{*2})^{1/2}$$

For example, a color with a*b* values of (10,0) would exhibit a lesser chroma than a color with a*b* values of (20,0). The latter color would be perceived qualitatively as being "more red" than the former.

"Machine Direction" or "MD", as used herein, means the direction parallel to the flow of the fibrous structure through the papermaking machine and/or product manufacturing equipment.

"Magenta", as used herein, refers to a color and/or base color which have a local maximum reflectance in the spectral region of from about 390 nm to about 490 nm and 621 nm to about 740 nm.

"Modulus", as used herein, is a stress-strain measurement which describes the amount of force required to deform a material at a given point.

"Paper product," as used herein, refers to any formed, fibrous structure products, traditionally, but not necessarily, comprising cellulose fibers. In one embodiment, the paper products of the present invention include tissue-towel paper products.

"Ply" or "plies," as used herein, means an individual fibrous structure, sheet of fibrous structure, or sheet of an absorbent paper product optionally to be disposed in a substantially contiguous, face-to-face relationship with other plies, forming a multi-ply fibrous structure. It is also contemplated that a single fibrous structure can effectively form two "plies" or multiple "plies", for example, by being folded on itself. In one embodiment, the ply has an end use as a tissue-towel paper product. A ply may comprise one or more wet-laid layers, air-laid layers, and/or combinations thereof. If more than one layer is used, it is not necessary for each layer to be made from the same fibrous structure. Further, the layers may or may not be homogenous within a layer. The actual makeup of a fibrous structure product ply is generally determined by the desired benefits of the final tissue-towel paper product, as would be known to one of skill in the art. The fibrous structure may comprise one or more plies of non-woven materials in addition to the wet-laid and/or air-laid plies.

"Process Printing," as used herein, refers to the method of providing color prints using three primary colors cyan, magenta, yellow and black. Each layer of color is added over a base substrate. In some embodiments, the base substrate is white or off-white in color. With the addition of each layer of color, certain amounts of light are absorbed (those of skill in the printing arts will understand that the inks actually "subtract" from the brightness of the white background), resulting in various colors. CMY (cyan, magenta, yellow) are used in combination to provide additional colors. Non-limiting examples of such colors are red, green, and blue. K (black) is used to provide alternate shades and pigments. One of skill in the art will appreciate that CMY may alternatively be used in combination to provide a black-type color.

"Red", as used herein, refers to a color and/or base color which has a local maximum reflectance in the spectral region of from about 621 nm to about 740 nm.

"Resultant Color," as used herein, refers to the color that an ordinary observer perceives on the finished product of a halftone printing process. As exemplified supra, the resultant color of magenta printed at a 20% halftone is pink.

"Sanitary tissue product", as used herein, means one or more fibrous structures, converted or not, that is useful as a wiping implement for post-urinary and post-bowel movement cleaning (bath tissue), for otorhinolaryngological discharges (facial tissue and/or disposable handkerchiefs), and multi-functional absorbent and cleaning uses (absorbent towels and/or wipes).

As used herein, the teens "tissue paper web, paper web, web, paper sheet and paper product" are all used interchangeably to refer to sheets of paper made by a process comprising the steps of forming an aqueous papermaking furnish, depositing this furnish on a foraminous surface, such as a Fourdrinier wire, and removing the water from the furnish (e.g., by gravity or vacuum-assisted drainage), forming an embryonic web, transferring the embryonic web from the forming surface to a transfer surface traveling at a lower speed than the forming surface. The web is then transferred to a fabric upon which it is through air dried to a final dryness after which it is wound upon a reel.

"User contacting surface" as used herein, means that portion of the fibrous structure and/or surface treating composition and/or lotion composition that is present directly and/or indirectly on the surface of the fibrous structure that is exposed to the external environment. In other words, it is the surface formed by the fibrous structure including any surface treating composition and/or lotion composition present directly and/or indirectly of the surface of the fibrous structure that can contact an opposing surface during use.

The user contacting surface may be present on the fibrous structure and/or sanitary tissue product for the use by the user and/or user contacting surface may be created/formed prior to and/or during the use of the fibrous structure and/or sanitary tissue product by the user. This may occur by the user applying pressure to the fibrous structure and/or sanitary tissue product as the user contact the user's skin with the fibrous structure and/or sanitary tissue product.

"Web materials" include products suitable for the manufacture of articles upon which indicia may be imprinted thereon and substantially affixed thereto. Web materials suitable for use and within the intended disclosure include fibrous structures, absorbent paper products, and/or products containing fibers. Other materials are also intended to be within the scope of the present invention as long as they do not interfere or counter act any advantage presented by the instant invention. Suitable web materials may include foils, polymer sheets, cloth, wovens or nonwovens, paper, cellulose fiber sheets, co-extrusions, laminates, high internal phase emulsion foam materials, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Such materials can be homogeneous or composition combinations.

Web materials also include products suitable for use as packaging materials. This may include, but not be limited to, polyethylene films, polypropylene films, liner board, paperboard, cartoning materials, and the like. Additionally, web materials may include absorbent articles (e.g., diapers and catamenial devices). In the context of absorbent articles in the form of diapers, printed web materials may be used to produce components such as backsheets, topsheets, landing zones, fasteners, ears, side panels, absorbent cores, and acquisition layers. Descriptions of absorbent articles and components thereof can be found in U.S. Pat. Nos. 5,569,234; 5,702,551; 5,643,588; 5,674,216; 5,897,545; and 6,120,489; and U.S. Patent Publication Nos. 2010/0300309 and 2010/0089264.

Also included within the scope of the definition are products suitable for use as packaging materials. This may include, but not be limited to, polyethylene films, polypropylene films, liner board, paperboard, cartoning materials, and the like.

"Yellow", as used herein, refers to a color and/or base color which have a local maximum reflectance in the spectral region of from about 571 nm to about 620 nm.

"Z-direction" as used herein, is the direction perpendicular to both the machine and cross machine directions.

All percentages and ratios are calculated by weight unless otherwise indicated. Furthermore, all percentages and ratios are calculated based on the total composition unless otherwise stated. Additionally, unless otherwise noted, all component or composition levels are in reference to the active level of that component or composition and are exclusive of impurities; for example, residual solvents or by-products which may be present in commercially available sources.

Exemplary Central Roll

Figure 3:
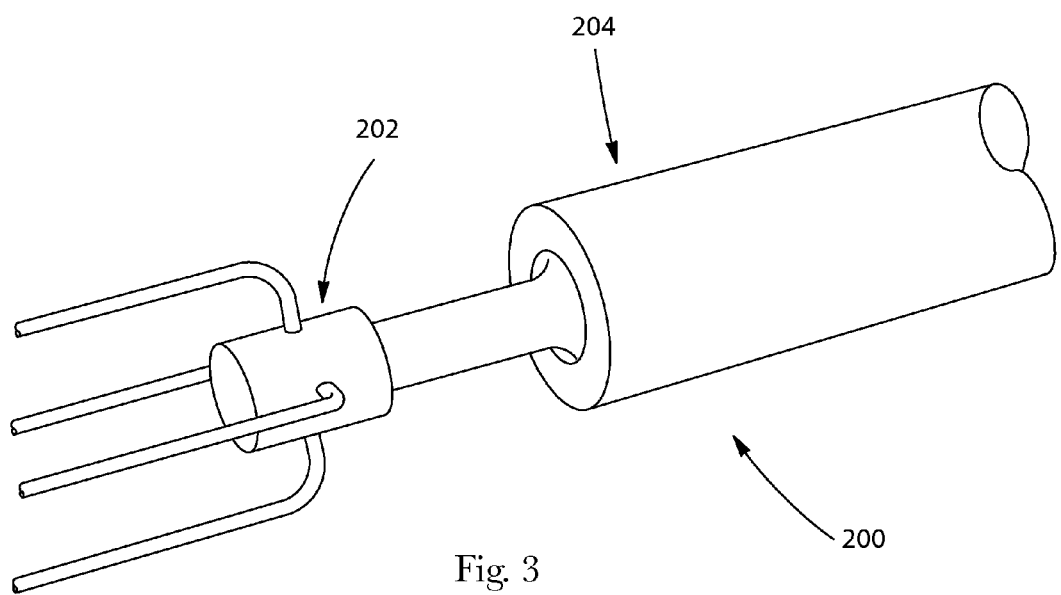
FIG. 3 is a perspective view of an exemplary gravure cylinder commensurate in scope with the present disclosure.

FIG. 3 shows a perspective view of an exemplary contact printing system commensurate in scope with the present disclosure. Such contact printing systems are generally formed from printing components that displace a fluid onto a web substrate or article (also known to those of skill in the art as a central roll) and other ancillary components necessary assist the displacement of the fluid from the central roll onto the substrate in order to, for example, print an image onto the substrate. As shown, an exemplary printing component commensurate in scope with the apparatus of the present disclosure can be a gravure cylinder 200. The exemplary gravure cylinder 200 is used to carry a desired pattern and quantity of ink and transfer a portion of the ink to a web material that has been placed in contact with the gravure cylinder which in turn transfers the ink to the web material. Alternatively, as would be understood by one of skill in the art, the principles of the present disclosure would also apply to a printing plate which in turn can transfer ink to a web material. In any regard, the invention of the present disclosure is ultimately used to apply a broad range of fluids to a web substrate at a target rate and in a desired pattern. By way of non-limiting example, the contact printing system of the present invention incorporating the unique and exemplary gravure cylinder 200 described herein can apply more than just a single fluid (e.g., can apply a plurality of individual inks each having a different color) to a web substrate when compared to a conventional gravure printing system as described supra (e.g., can only apply a single ink). Represented mathematically, the contact printing system of the present gravure cylinder (central roll) described herein can print X colors upon a web substrate utilizing X-Y printing components where X and Y are whole numbers and $0 < Y < X$, and $X > 1$.

In a preferred embodiment, the contact printing system 200 can print at least 2 colors with 1 printing component or at least 3 colors with 1 printing component or at least 4 colors with 1 printing component or at least 5 colors with 1 printing component or at least 6 colors with 1 printing component or at least 7 colors with 1 printing component or at least 8 colors with 1 printing component. In alternative embodiment, the contact printing system 200 can be provided with 2 or more printing components. In such exemplary embodiments, the contact printing system 200 can print at least 3 colors with 2 printing components or at least 4 colors with 2 printing components or at least 6 colors with 2 printing component or at least 8 colors with 2 printing components or at least 16 colors with 2 printing components or at least 4 colors with 3 printing components or at least 6 colors with 3 printing components or at least 8 colors with 3 printing components or at least 16 colors with 3 printing components or at least 24 colors with 3 printing components.

The basic gravure cylinder described herein can be applied in concert with other components suitable for a printing process. Further, numerous design features can be integrated to provide a configuration that prints multiple inks within the same gravure cylinder 200. A surprising and clear benefit that would be understood by one of skill in the art is the elimination of the fundamental constraint of flexographic or gravure print systems where a separate print deck is required for each color. The apparatus described herein is uniquely capable of providing all of the intended graphic benefits of a gravure printing system without all the drawbacks discussed supra.

The central roll (gravure cylinder 200) of the present invention particularly is provided with a multi-port rotary union 202. The use of a multi-port rotary union 202 provides the capability of delivering more than one ink color to a single gravure cylinder 200. It would be recognized by one of skill in the art that the multi-port rotary union 202 should be capable of feeding the desired number of colors per gravure cylinder 200. By way of non-limiting example, eight individual colors can be provided per gravure cylinder 200 through the use of the multi-port rotary union 202. By way of further non-limiting example, an apparatus comprising two gravure cylinders 200 can each be provided with eight individual inks per roll in order to provide up to sixteen individual inks and/or colors and one build or overlay per color.

One of skill in the art will understand that a conventional multi-port rotary union 202 suitable for use with the present invention can typically be provided with up to forty-four passages and are suitable for use up to 7,500 lbs. per square inch of ink pressure.

Figure 4A:
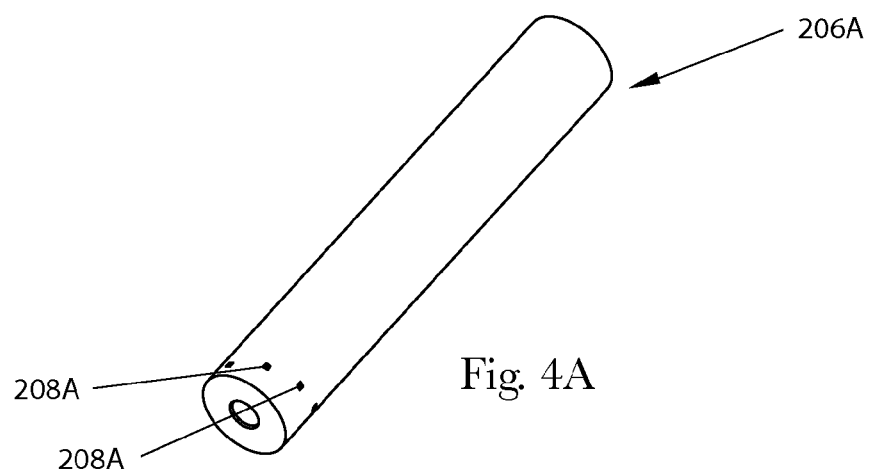
FIGS. 4A-4C are perspective views of exemplary gravure cylinder roll bodies according to the present disclosure.
Figure 4B:
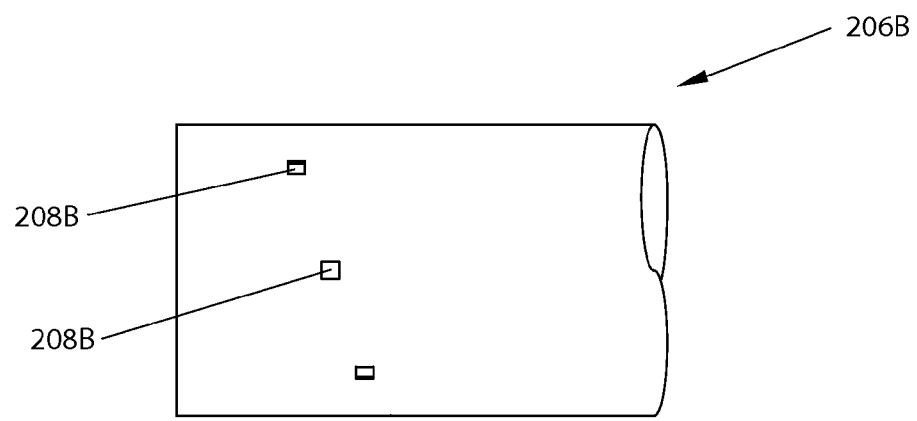
Figure 4C:
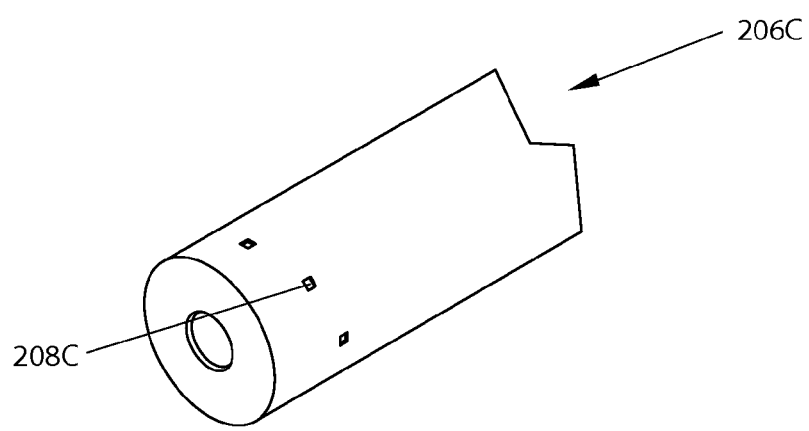

Individual fluids (e.g., inks, dyes, etc.) suitable for use with the gravure cylinder 200 of the instant apparatus can each be supplied through the multi-port rotary union 202 described supra. From there, each individual ink can be piped into the interior portion of the gravure cylinder roll body 206. In a preferred embodiment, each ink is provided with a separate supply point 208A, 208B, 208C as shown in FIGS. 4A-4C, respectively.

Figure 5A:
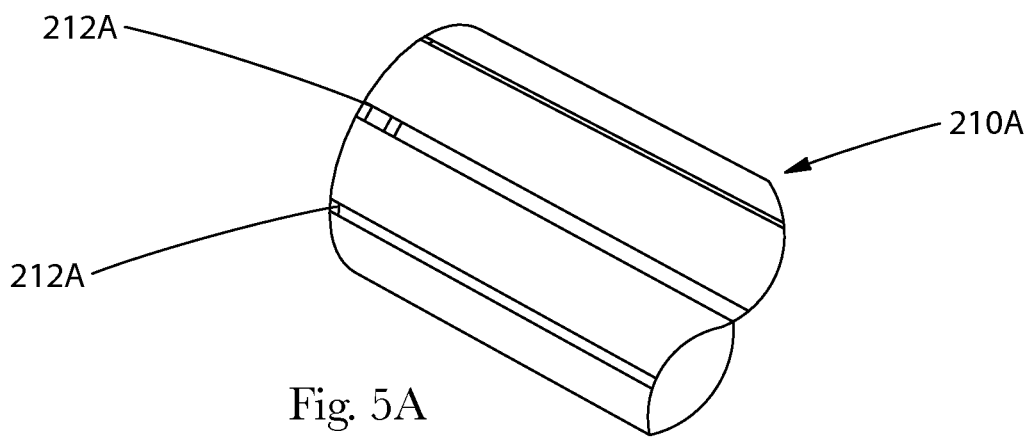
FIGS. 5A-5C are perspective views of exemplary gravure cylinder distribution manifolds according to the present disclosure.
Figure 5B:
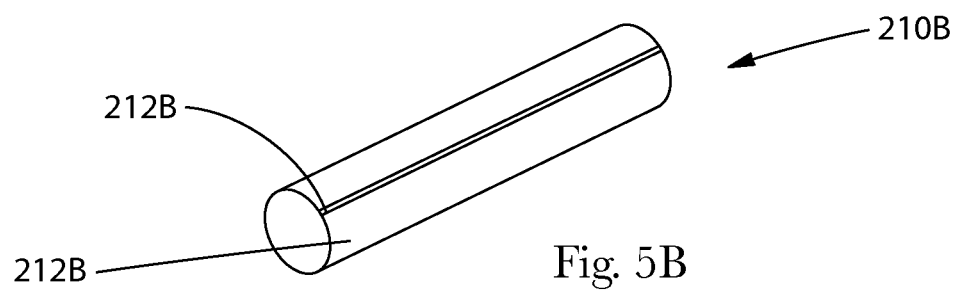
Figure 5C:
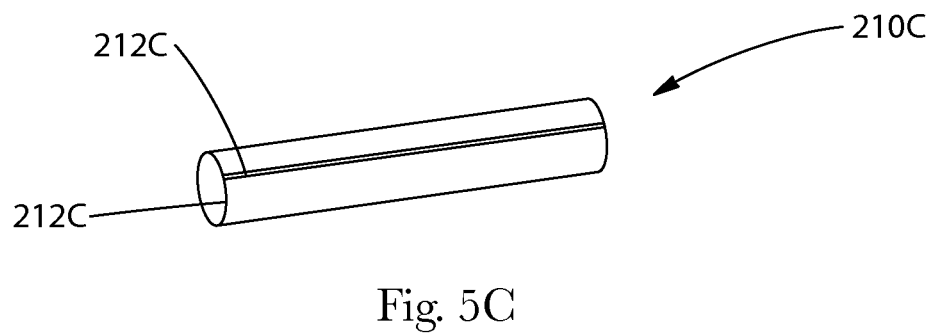

As shown in FIGS. 5A-5C, the supply point for each ink feeds into an individual color distribution manifold 212. Each individual color distribution manifold 212 is exclusive to that ink color and preferably extends axially along the length of the gravure cylinder roll body 206. The individual color distribution manifolds 212 are preferably spaced apart from each other to occupy different circumferential positions within the gravure cylinder roll body 206. These individual color distribution manifolds 212 can provide each individual ink color to all points along the axis of the gravure cylinder roll body 206 and gravure cylinder 200.

It should be noted that individual color distribution manifolds 212 may be combined at any point along their length. In effect, this is a combining of the fluid streams associated with each individual color distribution manifold 212 that can provide for the mixing of individual fluids to produce a third fluid that has the characteristics desired for the end use. For example a red ink and a blue ink can be combined in situ to produce violet.

In situ mixing within the body of gravure cylinder 200 can be facilitated with the use of static mixers. One of skill in the art will appreciate that a static mixer is a device for mixing fluid materials. The overall static mixer design incorporates a method for delivering two or more streams of liquids (each being called herein a 'primary' fluid) into the static mixer. As the streams move through the mixer, the non-moving elements continuously blend the materials (the resulting blend being called herein a 'secondary' fluid). Complete mixing is dependent on many variables including the fluid properties, tube inner diameter, the number of elements, the design of the elements, the fluid velocity, the fluid volume, the ratio of the fluids, the centrifugal force on the fluid as the gravure cylinder 200 is rotating, the acceleration and deceleration of the gravure cylinder 200, or any other energy imparting means to the fluid. By way of non-limiting example, in laminar flow, using a static mixer whose inner structure is comprised of helical elements, a processed material divides at the leading edge of each element of the mixer and follows the channels created by the element shape. At each succeeding element, the two channels are further divided, resulting in an exponential increase in stratification. The number of striations produced is $2^n$ where 'n' is the number of elements in the mixer. It should be realized that virtually any combination of fluids can be combined in order to form the resulting fluid (such as a desired ink color). By way of non-limiting example, any number of primary fluids may be combined to form a secondary fluid. Further, primary fluids may be combined with secondary fluids to produce a 'tertiary' fluid. Secondary fluids may be combined to produce a tertiary fluid; primary and/or secondary fluids may be combined with each other or with even tertiary fluids to produce 'quaternary' fluids, and so on. What is important to realize is that the scope of the present disclosure can result in virtually any combination of fluids to achieve the desired end result. Without desiring to be bound by theory, if the desired fluids are inks or dyes, the aforementioned combinations could produce any color within the MacAdam limits discussed infra.

Alternatively, in situ mixing can be facilitated with the use of a mixer that has moving elements incorporated into it to produce the desired fluid combination. By way of non-limiting example, an exemplary alternative mixer could incorporate balls within a region of the mixer tube. Without desiring to be bound by theory, it is believed that as energy is imparted to the moving elements through fluid flow, gravure cylinder 200 acceleration, gravure cylinder 200 deceleration, etc. the fluids inside the tube will be mixed.

Surprisingly, it has been observed that as two or more fluids feed into a mixer tube, a wide chroma color spectrum can be obtained for use simply by tapping off the mixer tube at various suitable locations along the tube. This can allow for the production of, and the eventual use of, various shades of mixed colors as well as a plurality of striated colors, in effect allowing the possibility of a resulting print resembling a "tie-dyed" effect to be applied to a substrate. It is believed that such a capacity has not been possible with prior print technologies and is indeed surprising.

Figure 6A:
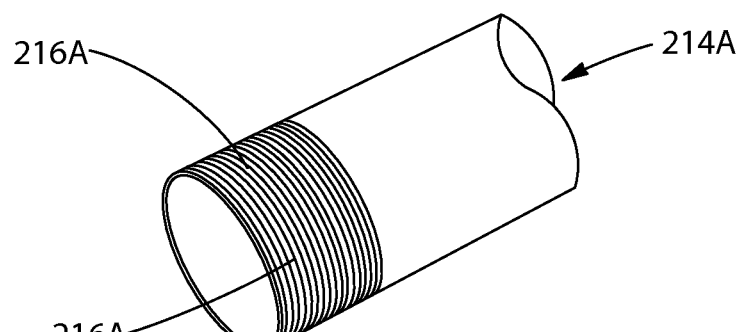
FIGS. 6A-6C are perspective views of exemplary gravure cylinder ink channel assemblies according to the present disclosure.
Figure 6B:
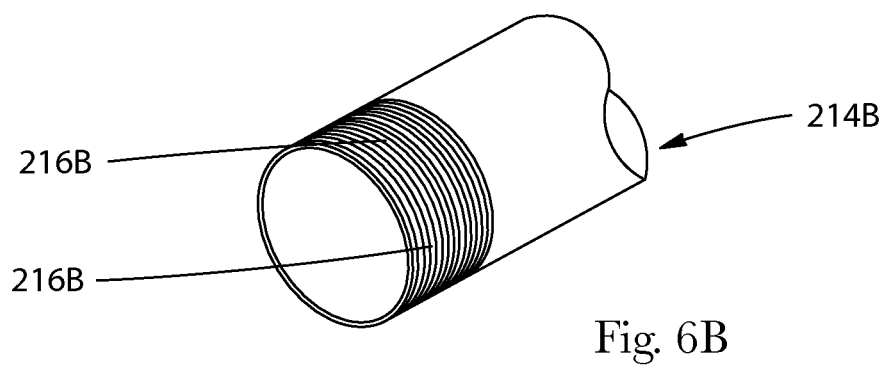
Figure 6C:
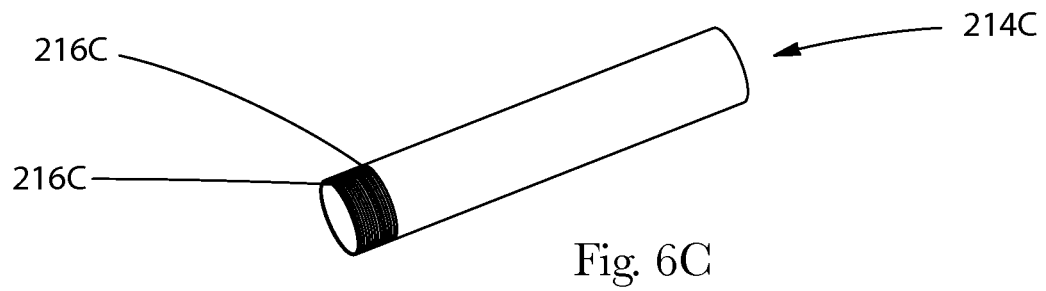

Next, as shown in FIGS. 6A-6C, a plurality of ink channels 216A-C is provided radially about ink channel assembly 214A-C. Ink channel assembly 214A-C is disposed circumferentially about a distribution manifold 210 so that fluid communication exists between an individual color distribution manifold 212 and an ink channel 216A-C corresponding to the individual color present in the distribution manifold 212. To be certain, each ink channel 216A-C is connected to a corresponding individual color distribution manifold 212 for that respective ink color. Each ink channel 216A-C provides a narrow reservoir of a specific ink color around the entire circumference of ink channel assembly 214A-C. It should readily be noticed by one of skill in the art that providing fluid communication between a respective distribution manifold 210 with a plurality of individual color distribution manifolds 212 associated with the distribution manifold 210 can easily distribute each respective ink color to any one of numerous circumferential ink channels disposed about ink channel assembly 214A-C. One of skill in the art will appreciate that this ensures that all ink colors within the gravure cylinder 200 are provided to all axial positions of the gravure cylinder 200 and in doing so provides the respective ink color radially around the gravure cylinder 200 at each respective axial location. Providing a distribution system in this manner ensures that any part of a print design disposed upon the surface of gravure cylinder 200 in any roll position can be fed by a nearby ink channel 216A-C for whichever ink color is desired for that desired specific print element.

It will also be readily recognized that each individual ink channel assembly 214A-C can be positioned proximate to an adjacent individual ink channel assembly 214A-C at heretofore unseen distances. This provides the surprising result of disposing one individual ink channel assembly 214A-C having, for example, blue ink disposed therein immediately adjacent a second individual ink channel assembly 214A-C having, for example, red ink disposed therein at heretofore unseen small distances. This can provide for unseen halftoning values of greater than 20 dpi or greater than 50 dpi or greater than 85 dpi or greater than 100 dpi or greater than 150 dpi print resolution for disparate inks disposed adjacent each other upon a web substrate.

Further, providing an individual ink channel assembly 214A-C immediately adjacent individual ink channel assembly 214A-C can facilitate the production of apparent colors across a gamut. For example an individual ink channel assembly 214A-C that has a fluid that is a mixture of blue ink and red ink that has been mixed in situ as discussed supra can be disposed adjacent an individual ink channel assembly 214A-C that itself contains an individual color or even yet another mixture of inks. This would enable the deposition of two hybrid colors immediately adjacent each other upon a web substrate thereby increasing the effective gamut of colors available for use in any given printing operation.

Figure 7A:
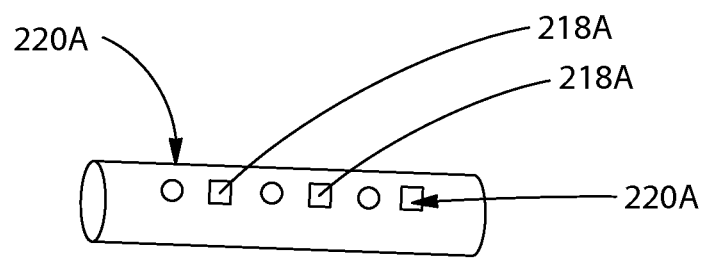
FIGS. 7A-7C are perspective views of exemplary gravure cylinder shaped reservoirs according to the present disclosure.
Figure 7B:
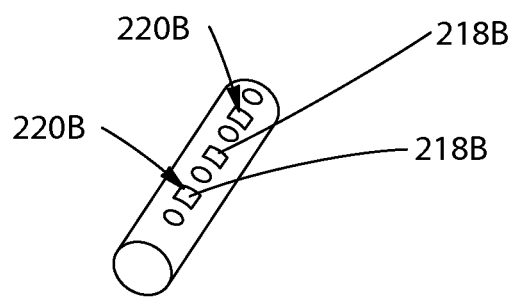
Figure 7C:
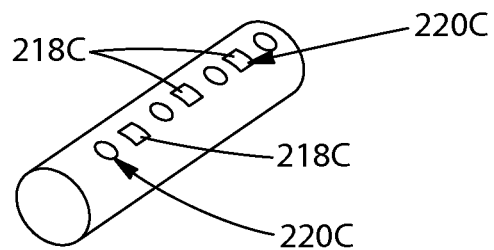

Another desirable capability of the apparatus of the instant description is to accurately deliver desired flow rates of fluids to target locations on the surface of a gravure cylinder. Current commercial configurations of gravure technology, however, are incapable of providing the resolution, localized flow rates, or low viscosity capabilities required to print inks at relatively high resolution. Thus, it was found that providing a fluid to a surface from a position internal to an imprinting roll, such as the gravure roll 200 of the instant application, can clearly provide for a broad range of fluid flow per unit area of the web material surface. This can be accomplished by manipulating the motive force on the fluid across the fluid transfer points. Thus, it is desirable for the apparatus of the instant application to supply a desired ink to a print zone 220A-C and then utilize a permeable gravure cell configuration for the desired web substrate application. Thus, each ink required for a particular element of a desired print pattern is preferably fed by the closest ink channel 216 described supra. The ink then flows from the channel 216 into a shaped reservoir 218A-C, as shown in FIGS. 7A-7C. Each shaped reservoir 218A-C is slightly oversized relative to the ink emanating from ink channel 216 of ink channel assembly 214 for the respective pattern elements of that color and shape in a particular print zone 220A-C. It should be recognized that print zones 220A-C and shaped reservoirs 218A-C are provided in a configuration disposed circumferentially about ink channel assembly 214. It should also be recognized that respective shaped reservoirs 218A-C may be disposed adjacent one another, spaced apart, or enclosed within one another. In any regard, the shaped reservoirs 218A-C should ultimately provide the capability to have multiple color ink reservoirs disposed at multiple desired positions just underneath the gravure cylinder surface 204 in a position that cooperates both axially and circumferentially.

In one embodiment the permeable gravure print elements 222A-C which are fluidically connected to the shaped reservoirs 218A-C may be formed by the use of electron beam drilling as is known in the art. Electron beam drilling comprises a process whereby high energy electrons impinge upon a surface resulting in the formation of holes through the material. In another embodiment the permeable gravure print elements 222A-C may be formed using a laser. In another embodiment the permeable gravure cells may be formed by using a conventional mechanical drill bit. In yet another embodiment the permeable gravure print elements 222A-C may be formed using electrical discharge machining as is known in the art. In yet another embodiment the permeable gravure print elements 222A-C may be formed by chemical etching. In still yet another embodiment the permeable gravure print elements 222A-C can be formed as part of the construction of a rapid prototyping process such as stereo lithography/SLA, laser sintering, or fused deposition modeling.

In one embodiment the shaped reservoirs 218A-C may comprise holes that are substantially straight and normal to the outer surface of the gravure cylinder 200. In another embodiment the shaped reservoirs 218A-C comprise holes proceeding at an angle other than 90 degrees from the outer surface of the gravure cylinder 200. In each of these embodiments each of the shaped reservoirs 218A-C has a single exit point at the second surface 120.

One of skill in the art will understand that state-of-the-art anilox and gravure rolls include laser engraved ceramic rolls and laser engraved carbon fiber within ceramic coatings. In either case, the cell geometry (e.g., shape and size of the opening at the outer surface, wall angle, depth, etc.) are preferably selected to provide the desired target flow rate, resolution, and ink retention in a gravure cylinder 200 rotating at high speed. As mentioned previously, current gravure systems utilize ink pans or enclosed fountains to fill the individual gravure cells with an ink from the outside of gravure cylinder 200. The aforementioned doctor blades wipe off excess ink such that the ink delivery rate is primarily a function of cell geometry. As mentioned previously, while this may provide a relatively uniform ink application rate, it also provides no adjustment capability to account for changes in ink chemistry, viscosity, substrate material variations, operating speeds, and the like. Thus, it was surprisingly found by the inventors of the instant disclosure that the disclosed technology may reapply certain capabilities of anilox and gravure cell technology in a modified permeable roll configuration.

Figure 8A:
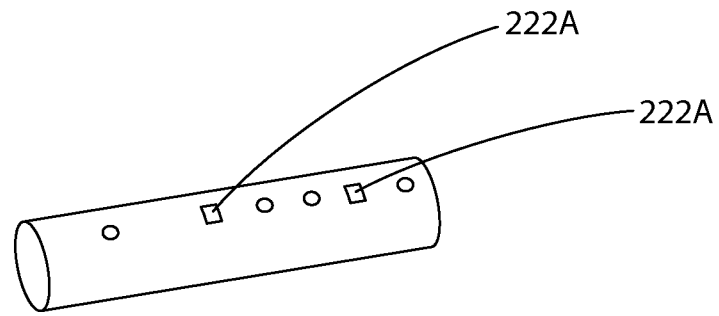
FIGS. 8A-8C are perspective views of exemplary gravure cylinder print elements according to the present disclosure.
Figure 8B:
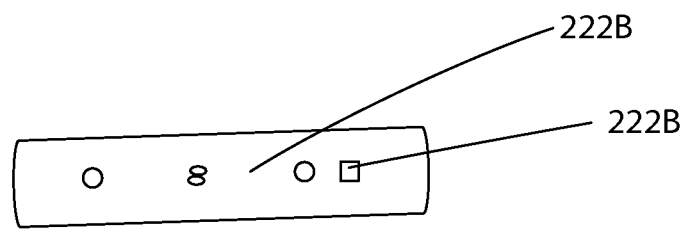
Figure 8C:
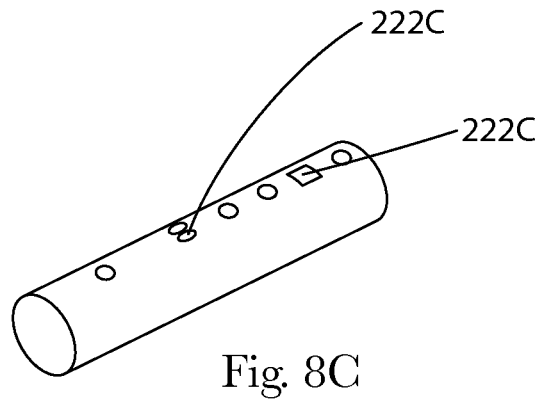

The outer surface of the herein described gravure cylinder 200 roll is preferably fabricated with typical gravure or anilox cell geometries with only two changes. The first is that cells are only required in the area of print coverage. The second is that the individual cells are permeable via openings in the bottom that ostensibly allow the desired ink to be fed from the underlying shaped reservoir into the gravure cell. One of skill in the art will appreciate that such openings in the bottom of the gravure print elements 222A-C could be made via laser drilling or any other suitable means after the gravure cells are formed. The desired flow rate of ink through the gravure cells may be controlled by the flow rate of that ink to the roll and could be further restricted in localized zones by flow restrictors positioned within the individual feed to each shaped reservoir. The shells of each gravure cylinder 200 may be manufactured in single roll width sleeve sections in order to provide flexibility for changing the desired print pattern. As such, a patterned gravure cylinder 200 surface transfers the print image directly onto the web material. This provides the direct gravure process and eliminates any flexographic equipment such as plate cylinders. Thus, in practice, a desired fluid such as an ink may be fluidly communicated through multi-port rotary union 202 to an individual color distribution manifold 212 into individual distribution manifolds 210. The respective ink then may be fluidly communicated to an ink channel assembly 214 and the respective ink channels 216 and then into a shaped reservoir 218, such as those shown in FIGS. 7A-7C. The desired ink enters the shaped reservoir 218 through a pore disposed distal from the surface of the shaped reservoir to fill the shaped reservoir 218. One of skill will understand that the gravure print element 222A-C disposed within print zone 220 may be sized as is currently done in anilox or gravure systems known to those of skill in the art. This enables retention of the desired quantity of ink and prevents ink sling even in high speed applications, such as those envisioned for use with the instant apparatus. The desired ink contained in the gravure print element 222A-C disposed within print zone 220 then is placed in fluid contact with a passing web substrate through a gravure print element 222A-C shown in FIGS. 8A-8C.

Alternatively, a non-limiting embodiment of the present disclosure provides for a patterned gravure cylinder 200 surface to transfer the print image directly onto a transfer roll or rolls (not shown). The print image can then be transferred to the web material from the transfer roll or rolls (not shown). This intermediary printing step can allow for the amount of fluid applied to the web material to be accurately metered to a desired level by reducing the amount of fluid or ink applied to the web material.

In one embodiment the gravure print element 222A-C may be provided by electron beam drilling and may have an aspect ratio of 25:1. The aspect ratio represents the ratio of the length of the gravure print element 222A-C to the diameter of the gravure print element 222A-C. Therefore a gravure print element 222A-C having an aspect ratio of 25:1 has a length 25 times the diameter of the gravure print element 222A-C. In this embodiment the gravure print element 222A-C may have a diameter of between about 0.001 inches (0.025 mm) and about 0.030 inches (0.75 mm). The gravure print element 222A-C may be provided at an angle of between about 20 and about 90 degrees from the surface of the gravure cylinder 200. The gravure print element 222A-C may be accurately positioned upon the surface of the gravure cylinder 200 to within 0.0005 inches (0.013 mm) of the desired non-random pattern of permeability.

In one embodiment the 25:1 aspect ratio limit may be overcome to provide an aspect ratio of about 60:1. In this embodiment holes 0.005 inches (0.13 mm) in diameter may be electron beam drilled in a metal shell about 0.125 inches (3 mm) in thickness. Metal plating may subsequently be applied to the surface of the shell. The plating may reduce the nominal gravure print element 222A-C diameter from about 0.005 inches (0.13 mm) to about 0.002 inches (0.05

The opening of the gravure print element 222A-C at the surface of gravure cylinder 200 may comprise a simple circular opening having a diameter similar to that of the portion of the gravure print element 222A-C extending between the shaped reservoir 218 and the surface of gravure cylinder 200. In one embodiment the opening of the gravure print element 222A-C at the surface of gravure cylinder 200 may comprise a flaring of the diameter of the portion of the gravure print element 222A-C extending between the shaped reservoir 218 and the gravure print element 222A-C. In another embodiment, the opening of the gravure print element 222A-C at the surface of gravure cylinder 200 may reside in a recessed portion of the surface of gravure cylinder 200. The recessed portion of the surface of gravure cylinder 200 may be recessed from the general surface by about 0.001 to about 0.030 inches (about 0.025 to about 0.72 mm). The opening of the gravure print element 222A-C opening may comprise other shapes, as would be understood by one skilled in the art. By way of non-limiting example, suitable shapes may include ellipses, squares, rectangles, diamonds, and combinations thereof and others may be used as dot shapes. One of skill in the art would understand that a combination of dot shapes may be used. This may be suitable for use especially when halftoning to control dot gain and moiré effects. In any regard, it was found that the spacing of the gravure print openings is selected to give the printed image enough detail for the intended viewer. The spacing of the gravure openings is called print resolution.

The accuracy with which the gravure print element 222A-C may be disposed upon the surface of gravure cylinder 200 of the fluid transfer component 100 enables the permeable nature of the gravure cylinder 200 to be decoupled from the inherent porosity of the gravure cylinder 200. The permeability of the gravure cylinder 200 may be selected to provide a particular benefit via a particular fluid application pattern. Locations for the gravure print element 222A-C may be determined to provide a particular array of permeability in the gravure cylinder 200. This array may permit the selective transfer of fluid droplets formed at gravure print element 222A-C to a fluid receiving surface of a moving web material brought into contact with the fluid droplets.

In one embodiment an array of gravure print elements 222A-C may be disposed to provide a uniform distribution of fluid droplets to maximize the ratio of fluid surface area to applied fluid volume. The pattern of gravure print element 222A-C upon the surface of gravure cylinder 200 may comprise an array of gravure print elements 222A-C having a substantially similar diameter or may comprise a pattern of gravure print elements 222A-C having distinctly different pore diameters. In one embodiment, the array of gravure print elements 222A-C comprises a first set of gravure print elements 222A-C having a first diameter and arranged in a first pattern. The array further comprises a second set of gravure print elements 222A-C having a second diameter and arranged in a second pattern. The first and second patterns may be arranged to interact each with the other. The multiple patterns may visually complement each other. The multiple patterns of pores may be arranged such that the applied fluid patterns interact functionally.

In another embodiment any gravure print element 222A-C disposed upon the surface of gravure cylinder 200 may have more than one fluid (each fluid being a primary fluid) being fed into it, thus allowing mixing of the fluids (the resulting mixture of primary fluids being a secondary fluid) at the surface of the gravure cylinder 200. In yet another embodiment, a single fluid can be routed to multiple gravure print elements 222A-C where the gravure print elements 222A-C could be the same or different diameters yet the fluid flow and pressure to each gravure print element 222A-C is separately controlled by the feed that supplies each gravure print element 222A-C. To one of skill in the art, it would be obvious that the pressure and flow to each gravure print element can be controlled by manipulating basic piping variables. For instance the diameter of the fluid channels can be changed, the length of the channels, the number and angle of the curves in the channels, and the size of the gravure elements would all affect the pressure and flow of the fluid to the gravure print elements on the surface of the gravure cylinder.

The application of fluid (such as an ink) from the pattern of the gravure print elements 222A-C to a web material may be registered. By registered it is meant that ink applied from a particular gravure print element 222A-C of the pattern deliberately corresponds spatially with particular portions of the web material. This registration may be accomplished by any registration means known to those of skill in the art. In one embodiment the registration of the gravure print elements 222A-C and a web material may be achieved by the use of a sensor adapted to identify a feature of the web material and by the use of a rotary encoder coupled to a rotating gravure cylinder 200. The rotary encoder may provide an indication of the relative rotary position of at least a portion of the pattern of gravure print elements 222A-C. The sensor may provide an indication of the presence of a particular feature of the web material. Exemplary sensors may detect features imparted to the web material solely for the purpose of registration or the sensor may detect regular features of the web material applied for other reasons. As an example, the sensor may optically detect an indicium or indicia printed or otherwise imparted to the web material. In another example the sensor may detect a localized physical change in the web material such as a slit or notch cut in the web material for the purpose of registration or as a step in the production of a web based product. The registration may further incorporate an input from a web speed sensor.

By combining the data from the rotary encoder, the feature sensor, and the speed sensor, a controller may determine the position of a web material feature and may relate that position to the position of a gravure print element 222A-C or set of gravure print elements 222A-C. By making this relation the system may then adjust the speed of either the rotating gravure cylinder 200 or the speed of the web material to adjust the relative position of the gravure print elements 222A-C and web material feature such that the gravure print element 222A-C will interact with the web material with the desired spatial relationship between the feature and the applied fluid (e.g., ink).

Such a registration process may permit multiple fluids to be applied in registration each with the others. Other possibilities include registering fluids with embossed features, perforations, apertures, and indicia present due to papermaking processes.

Figure 9:
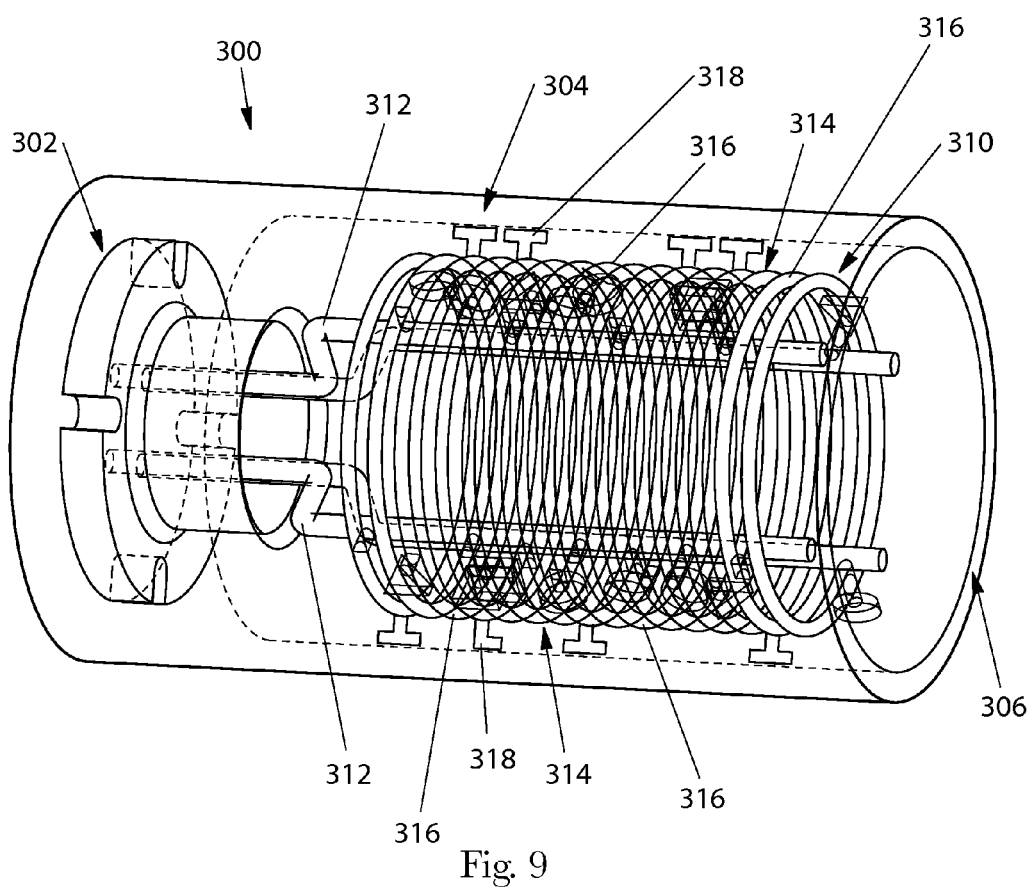
FIG. 9 is a perspective see-through view of an exemplary gravure cylinder according to the present disclosure.

It was surprisingly found that a gravure cylinder 300, such as that depicted in FIG. 9, can be manufactured in the form of a unibody construction. Such unibody constructions typically enable building parts one layer at a time through the use of typical techniques such as SLA/stereo lithography, SLM/Selective Laser Melting, RFP/Rapid freeze prototyping, SLS/Selective Laser sintering, SLA/Stereo lithography, EFAB/Electrochemical fabrication, DMDS/Direct Metal Laser Sintering, LENS®/Laser Engineered Net Shaping, DPS/Direct Photo Shaping, DLP/Digital light processing, EBM/Electron beam machining, FDM/Fused deposition manufacturing, MJM/Multiphase jet modeling, LOM/Laminated Object manufacturing, DMD/Direct metal deposition, SGC/Solid ground curing, JFP/Jetted photo polymer, EBF/Electron Beam Fabrication, LMJP/liquid metal jet printing, MSDM/Mold shape deposition manufacturing, SALD/Selective area laser deposition, SDM/Shape deposition manufacturing, combinations thereof, and the like. However, as would be recognized by one familiar in the art, such a unibody gravure cylinder 300 can be constructed using these technologies by combining them with other techniques known to those of skill in the art such as casting. As a non-limiting example, the "inverse roll" or the desired fluid passageways desired for a particular gravure cylinder 300 could be fabricated, and then the desired gravure cylinder 300 material could be cast around the passageway fabrication. If the passageway fabrication was made of hollow fluid passageways the gravure cylinder 300 would be created. A non-limiting variation of this would be to make the passageway fabrication out of a soluble material which could then be dissolved once the casting has hardened to create the gravure cylinder 300.

Figure 10:
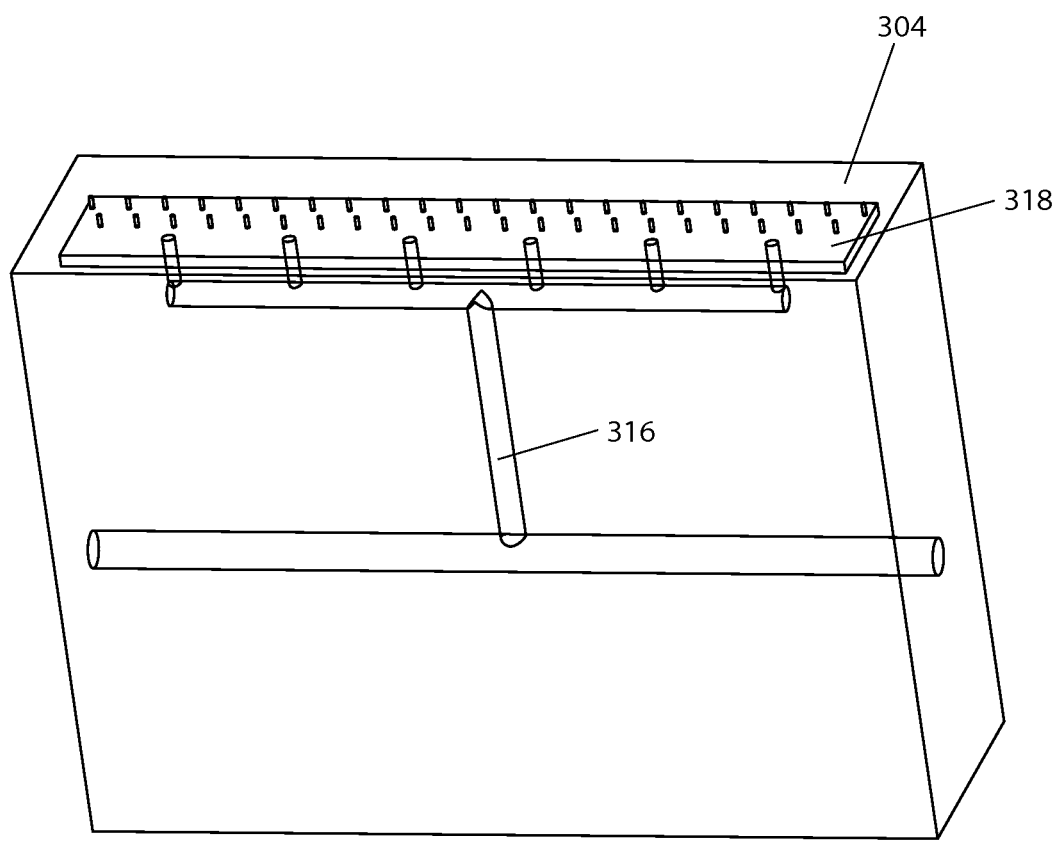
FIG. 10 is a perspective expanded view of an exemplary fluid channel, individual shaped reservoir, and exemplary gravure print elements of the exemplary gravure cylinder of FIG. 9.

In still yet another non-limiting example, sections of the gravure cylinder 300 could be fabricated separately and combined into a final gravure cylinder 300 assembly. This can facilitate assembly and repair work to the parts of the gravure cylinder 300 such as coating, machining, heating and the like, etc. before they are assembled together to make a complete contact printing system such as gravure cylinder 300. In such techniques, two or more of the components of a gravure cylinder 300 commensurate in scope with the instant disclosure can be combined into a single integrated part. By way of non-limiting example, the gravure cylinder 300 having a distribution of manifold 310, an individual color distribution manifold 312, integrated channel assemblies 314, and ink channels 316 can be fabricated as an integral component. Such construction can provide an efficient form for forming the required fluid circuits forming ink channels 316 without the complexity of multi-part joining and sealing. The resultant gravure cylinder 300, shown in FIG. 9, provides for fluid communication to be manufactured in situ to include structure that is integrated from the multi-port rotary union 302 to individual color distribution manifolds 312 through ink channels 316. As shown in FIGS. 9 and 10, each ink channel 316 can be provided with multiple outlets to individual shaped reservoirs 318 underlying the gravure cylinder surface 304.

Alternatively, and by way of another non-limiting example, the gravure cylinder 300 could similarly be constructed as a uni-body structure where fluid communication is manufactured in situ to include structure that is integrated from the multi-port rotary union 302 to individual color distribution manifolds 312. One or more ink channels 316 can then be provided to fluidly communicate the fluid from each distribution manifold 312 to the gravure cylinder surface 304 without the need of a individual shaped reservoirs 318, but instead each of the gravure print element 222A-C on the gravure cylinder surface 304 would be directly fed from any single ink channel 316 whose distal end opens at the gravure cylinder surface 304 in the desired gravure print element 222A-C size and location.

Another benefit realized by the constructions described herein provides the ability to route the fluids omni-directionally using amorphous passageways of equal or different lengths and varying fluid passageway diameters to control flow and pressure of the fluids throughout the roll up to and including each individual gravure cell as well as to bring a fluid(s) to any given location within the roll or to the roll surface. Another unexpected benefit of many of the unibody fabrication techniques is the use of materials for constructing the gravure cylinder 300 that are translucent or even transparent. One of skill in the art will readily recognize that this can provide numerous advantages in maintenance and color monitoring. One of skill in the art will readily understand that these unexpected benefits can be even further enhanced by adding various enhancements such as the addition of a light source within or proximate to the gravure cylinder 300 for increased visibility of the gravure cylinder 300 or into the interior of gravure cylinder 300.

An alternative embodiment, a contact printing system such as gravure cylinder 300 may be provided with a gravure cylinder surface 304 that is permeable in nature that is integrally formed with the formation of gravure cylinder 300. One of skill in the art will appreciate that such a design may be preferred if the design disposed upon the gravure cylinder surface 304 of gravure cylinder 300 is not often subject to change. One of skill in the art would appreciate that if the design disposed upon gravure cylinder surface 304 of gravure cylinder 300 is changing consistently or on a relatively often basis, it may be preferable to construct a gravure cylinder 300 so that the gravure cylinder surface 304 is disposed about a gravure cylinder roll body 306 in an exchangeable or replaceable configuration. Thus, fluid communication would necessarily need to be provided between gravure cylinder roll body 306 and the subject gravure cylinder surface 304 in such a configuration. In such a configuration, one of skill in the art would also appreciate that maintaining the gravure cylinder roll body 306 in a standard configuration and replacing the gravure cylinder surface 304 would significantly reduce the amount of fabrication required to produce gravure cylinder 300.

As shown in FIG. 10, a finally assembled contact printing system such as in the form of a gravure cylinder 300 is shown as a compilation of component parts. Each component is provided as a cylindrical embodiment with each succeeding component being circumferentially disposed in succession upon the surface of the previous component. By way of example, the gravure cylinder roll body 306 can be provided as a cylinder having a longitudinal axis parallel to the cross-machine direction of a web material that ostensibly would be placed in contacting engagement with the gravure cylinder surface 304 of resulting gravure cylinder 300. Distribution manifold 310 is disposed about the surface of gravure cylinder roll body 306. As it should be recalled, distribution manifold 310 provides contacting engagement of the inks entering the gravure cylinder 300 through multi-port rotary union 302 into fluid contact with individual color distribution manifold 312. The fluids (inks) positioned within individual color distribution manifold 312 may then be conducted into ink channel assembly 314 and into corresponding ink channels 316 disposed circumferentially about ink channel assembly 314. Alternatively, the contents of each individual ink channel 316 can be combined in situ on an as-needed basis to provide for a hereto unforeseen color gamut. Each individual ink channel 316 is then placed into contacting engagement with a shaped reservoir 318 disposed about ink channel assembly 314. Each shaped reservoir 318 is then preferably provided in fluid communication with the corresponding print zone 320 into a corresponding gravure print element 222 disposed upon the gravure cylinder surface 304 of gravure cylinder 300. One of skill in the art should recognize that each corresponding layer forming gravure cylinder 300 effectively is telescoped upon the succeeding layer to form a complete gravure cylinder 300.

It should be readily recognized that two or more gravure cylinders 300 can be combined in a printing apparatus forming a contact printing system commensurate in scope with the present disclosure to form various color builds spanning the gamut of available colors of the spectrum as well as provide unique opportunities to enhance the total number of colors available for printing onto a web substrate from gravure cylinder 300. In any regard, the number of rolls required for a printing apparatus using the unique gravure cylinder technology discussed herein can depend on the number of colors necessary for the desired finished product as well as the desired color builds for eventual application to a web substrate. Naturally, one of skill in the art will understand that technologies exist, or may exist, that can allow for numerous colors to be provided by a single gravure cylinder 300. This can depend upon the characteristics of the material to be used to form gravure cylinder 300 and/or its constituent components, the physical lay-out of the desired print elements disposed upon the surface of gravure cylinder 300, the state of the art of the equipment used to manufacture each component of gravure cylinder 300, as well as the characteristics of the ink(s) used in the intended gravure process.

One of skill in the art would recognize that color builds are commonly used in process printing to create a multitude of desired colors from a common base palette of colors. It is in this way that printers are able to create additional colors from a previous set of developed colors. For example, overlaying a yellow ink upon a blue ink is known to create a green color. But what will be readily recognized is that the technology disclosed by the instant application can greatly expand the range of colors that can be printed by known processes. Thus, it may be desirable to provide a printing apparatus that comprises at least two gravure roll systems in an overall printing system. In an exemplary yet non-limiting embodiment, a printing system may be developed that includes two of the aforementioned gravure cylinder technologies commensurate in scope with the present disclosure. If each gravure cylinder of the exemplary print system is capable of printing at least eight individual colors, utilizing two such permeable gravure rolls (such as those described by the present disclosure), could provide the printing system that could print sixteen different colors on a web material with each color being distinct from one another. By way of example, if a first gravure roll of a contact printing system has eight colors designated as A-H and a second print roll has been provided eight separate colors designated J-R, one of skill in the art would understand that color A from the first of such rolls may be overlaid with color J from the second printing roll to produce a color AJ. Continuing on, color A could also be overlaid with a second color K to produce a color AK and so on. The total number of potential permutations increases exponentially with the number of colors used in each roll and the number of rolls used in the contact printing system.

As described supra, those of skill in the art will appreciate the especially surprising color palette capable of being produced by the apparatus of the present invention upon absorbent paper products because those of skill in the art will appreciate that absorbent paper product substrates are relatively difficult to print on. Without wishing to be limited by theory, it is thought that because many absorbent paper product substrates are textured, a relatively high level of pressure must be used to transfer ink to the spaces on the surface of the absorbent paper product substrate. In addition, absorbent paper product substrates tend to have a higher amount of dust that is generated during a printing process, which may cause contamination at high speeds using ordinary printing equipment. Further, because an absorbent paper product substrate tends to be more absorbent than an ordinary printable substrate, there may be a relatively high level of dot gain (the spread of the ink from its initial/intended point of printing to surrounding areas). Those of skill in the art will appreciate that a typical piece of paper that may be used for printing a book will have a dot gain of about 3% to about 4% whereas an absorbent paper product may have a dot gain as high as about 20%. As a result, web materials (such as those commensurate in scope with the present disclosure) are typically unable to balance low intensity and high intensity printing. One of skill in the art will appreciate that the ability to achieve smooth tone gradients over the entire tonal range with currently available printing processes is problematic, especially at low (0% to 20%) and high (70% to 100%) halftone densities. In other words, output halftone density is related to input halftone density with the undesired effect of dot gain upon the web substrate. Thus, web materials are typically found to be devoid of colors within the available color gamut at the low end halftone densities. Additionally, halftone control at the high end of the gamut is reached too early with current printing techniques thereby requiring additional dot gain compensation. One of skill in the art will also appreciate that low-intensity colors often serve as the basis for other colors. Prior art strategies of simply increasing color density are found to actually cause a color to lose its chromaticity, and due to a smaller gamut, are found to require the use of a thicker film, which may lead to drying issues and higher cost.

Thus, it was surprisingly found that the apparatus of the present disclosure can provide a linear relationship between input halftone density and output halftone density over the entire color gamut on a finally printed product. Thus, it is preferred that there is a 1:1 relationship between input halftone density and output halftone density. Expressed mathematically, output halftone density equals input halftone density plus dot gain. Preferably, dot gain is less than 20% or less than 10% or less than 5%, or zero.

Figure 11:
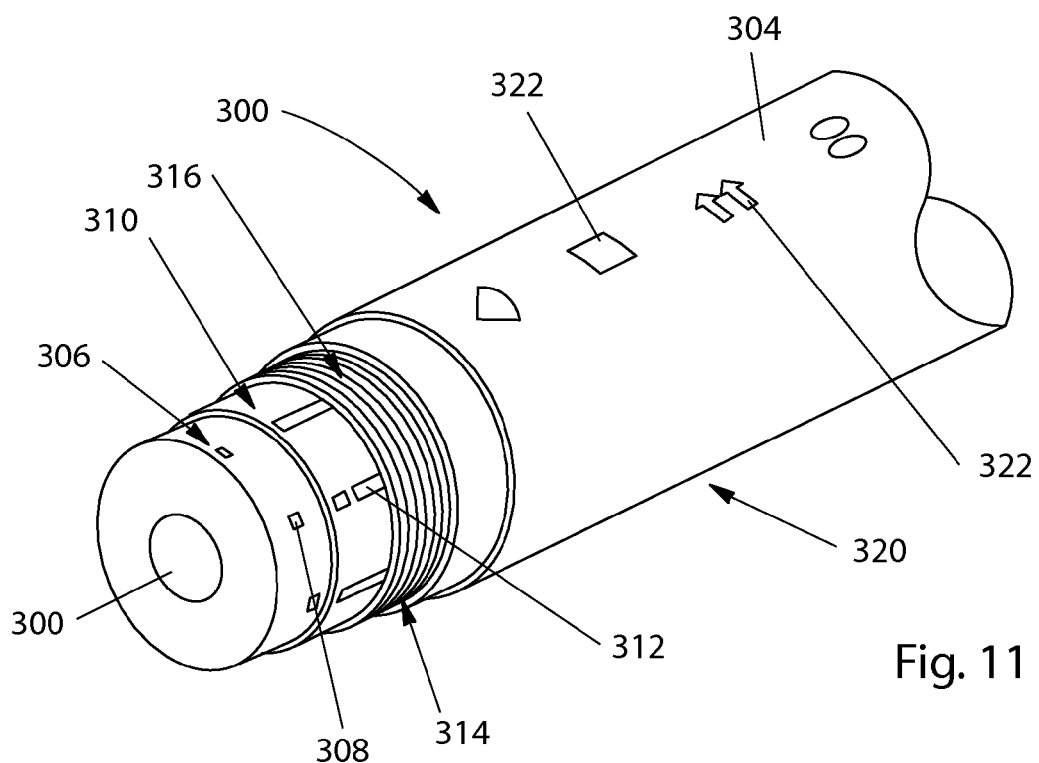
FIG. 11 is a perspective view of an exemplary gravure cylinder showing the overlaying of each element forming a gravure cylinder according to the present disclosure.
Figure 12:
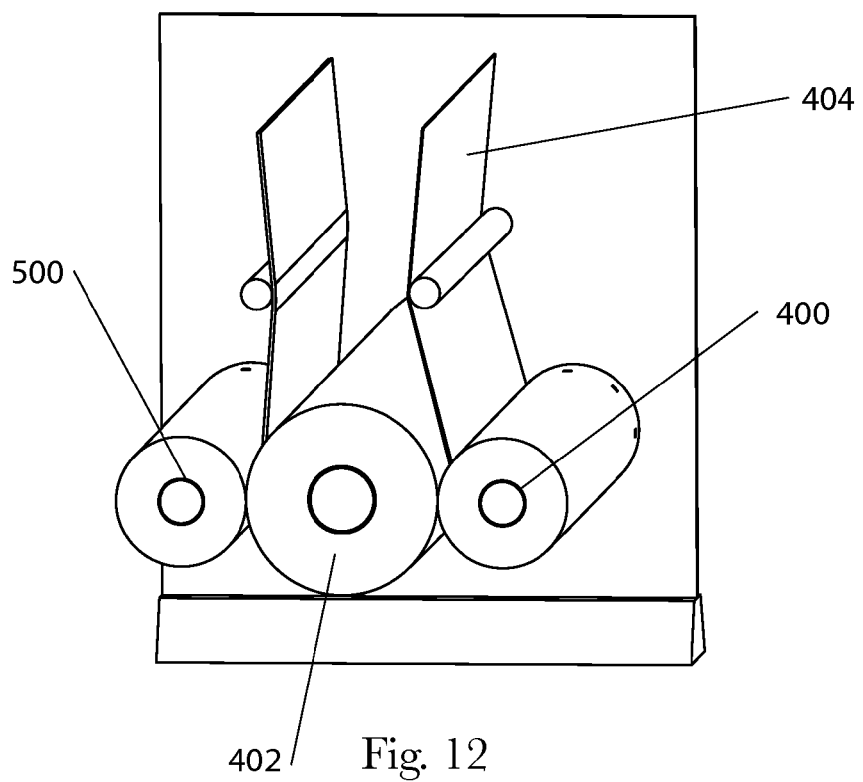
FIG. 12 is a schematic view of an exemplary two gravure cylinder system capable of printing more than two colors upon a web substrate according to the present disclosure.

As shown in FIG. 11, an exemplary contact printing apparatus can be provided with first and second gravure cylinders 400, 500 disposed about a common impression cylinder 402. In a preferred embodiment of such an apparatus, each gravure cylinder 400, 500 is preferably supplied with eight separate and unique colors. Providing a web material 404 that traverses between a first nip performed between first gravure cylinder 400 and impression cylinder 402 and through the second nip formed between second gravure cylinder 500 and impression cylinder 402 can provide several unique color deposition opportunities. One of skill in the art will readily recognize that providing a web material 404 to be disposed around the surface of the central impression cylinder 402 from the point at which the first ink is applied from first gravure cylinder 400 to the last of any such ink applied by the second gravure cylinder 500 could clearly minimize sheet strain, wrinkles, and the like that would negatively impact a finally produced web product. Furthermore, and surprisingly so, the registration accuracy of the inks disposed upon the web substrate 404 in such a system will provide unheard-of overall print quality. It should be readily recognized by one of skill in the art that such a contact printing system can provide an even larger palette of colors, all registered relatively accurately to one another.

The embodiment shown in FIG. 11 would be recognized by one of skill in the art as providing the opportunity to provide any one of many individual colors to any shape reservoir and the printing surface of each gravure roll and then provide process color builds via the use of extra rolls. If greater capability for processed color builds is desired, an off-line ink mixing/delivery system could be used to supply a different color produced by mixing two or more colors prior to entering the roll. An alternative embodiment would necessarily mix two or more colors from the circumferential color channels via the use of static mixers or other suitable means prior to feeding the mixed color into the shaped reservoir. Such a system would create a process color build option in the ink supply versus an overlay on the product.

By way of non-limiting example, the currently described contact printing system can print cyan in one print station and then overlay yellow in a succeeding print station. The result is cyan and yellow ink dots printed in the same region on the sheet with some of the yellow dots overlying cyan dots and many of them not. In any regard, the region appears to be green. In the alternative embodiment described above, the cyan and yellow inks from the circumferential ink channels would be mixed prior to entry into the shaped reservoir inlet. Green ink would thus be fed into the shaped reservoir, and green dots would be directly printed on the sheet. Such a system would better mimic the process printing overlay builds currently used for high quality high resolution products and minimize the need for additional rolls in any particular unit operation.

In one embodiment of an exemplary contact print system, the gravure cylinder 200 may be configured such that the web material wraps at least a portion of the circumference of the gravure cylinder 200. In this embodiment the extent of the wrap by the web material may be fixed or variable. The degree of wrap may be selected depending upon the amount of contact time desired between the web material and the gravure cylinder 200. The range of the degree of wrap may be limited by the geometry of the processing equipment. Web material wraps as low as 5 degrees and in excess of 300 degrees are possible. For a fixed wrap the gravure cylinder 200 may be configured such that the web material consistently contacts a fixed portion of the circumference of the gravure cylinder 200. In a variable wrap embodiment (not shown) the extent of the gravure cylinder 200 contacted by the web material may be varied by moving a web contacting dancer arm to bring more or less of the web material into contact with the gravure cylinder 200.

The gravure cylinder 200 may also comprise a means of motivating a fluid through the gravure cylinder 200. In one embodiment the motivation of a fluid may be achieved by configuring a fluid supply as a fluid reservoir disposed above the gravure cylinder 200 such that gravity will motivate the fluid to move from the fluid supply through the gravure cylinder 200 to the surface of gravure cylinder 200.

In another embodiment the gravure cylinder 200 may comprise a pump to motivate a fluid from a fluid supply to the gravure cylinder 200. In this embodiment the pump may also motivate a fluid through the gravure cylinder 200. In this embodiment a pump may be controlled to provide a constant volume of a fluid at the multi-port rotary union 202 with respect to the quantity of web material processed. The volume of a fluid made available at the surface of gravure cylinder 200 may be varied according to the speed of the web material. As the web speed increases the volume of available fluid may be increased such that the rate of fluid transfer to the web material per unit length of web material or per unit time remains substantially constant. Alternatively the pump may be controlled to provide a constant fluid pressure at the input to gravure cylinder 200. This method of controlling the pump may provide for a consistent droplet size upon the surface of gravure cylinder 200. The pressure provided by the pump may be varied as the speed of the web material varies to provide consistently sized droplets regardless of the operating speed of the gravure cylinder 200.

Other design features can be incorporated into the gravure cylinder 300 design as well to aid in fluid control, roll assembly, roll maintenance, and cost optimization. By way of non-limiting example, check valves or gates or other such devices can be provided integral within the gravure cylinder 300 to control the flow and pressure of fluids being routed throughout the gravure cylinder 300. In another example, the gravure cylinder 300 may contain a closed loop fluid recirculation system(s) where the fluid(s) could be routed back to any point inside the gravure cylinder 300 or to any point external to the gravure cylinder 300 such as a fluid feed tank or an incoming feed line to the gravure cylinder 300. In another example, the gravure cylinder 300 could be fabricated so that the surface of the gravure cylinder 300 is provided with a multi-radiused (i.e., differentially radiused) surface. This may be done to facilitate cleaning of the gravure cylinder 300 surface and/or fluid transfer from the surface of the gravure cylinder 300 to a substrate. In yet another example, the gravure cylinder 300 construction could be made by putting segments together to form a full size gravure cylinder 300. This would allow replacement of just a section of a gravure cylinder 300 if there was localized damage to the gravure cylinder 300 as well as enables fabrication of a gravure cylinder 300 over a much wider range of machines.

Printing

In another embodiment, a gravure cylinder 300 may be fabricated with gravure cylinder surface 304 formed from sintered metal material. This should be known by those of skill in the art to be inherently permeable. In such an embodiment, the gravure cylinder surface 304 of gravure cylinder 300 may be machined by any suitable means to create topography similar to the outer surface topography of any prior art flexographic printing sleeve or plate. Ink may be supplied to the internal portion of the gravure cylinder 300 as described supra. Ink flow may be controlled by any suitable means, including those described supra, to motivate the ink to flow through the sintered metal surface of gravure cylinder 300 and on to a web material disposed against the surface of gravure cylinder 300.

In yet another embodiment, a gravure cylinder 300 roll having a sintered metal outer surface as described supra may be provided with relieved portions of the gravure cylinder surface 304 that are plated or otherwise treated to prevent ink flow therethrough. It is believed that this may further improve final print quality observed upon the web substrate by ensuring that ink flow only occurs in the distal surfaces of the sintered metal disposed upon the gravure cylinder surface 304 of gravure cylinder 300.

All of the embodiments disclosed herein are believed to provide a superior printing system. Those skilled in the art will recognize that any fluids other than ink may be advantageously applied to a substrate. Said other fluids may include fluids which alter the properties of the substrate or provide supplemental benefits, including but not limited to softening agents, cleaning agents, dermatological solutions, wetness indicators, adhesives, and the like.

As described supra, those of skill in the art will appreciate that printing on absorbent paper product substrate poses additional difficulties compared to ordinary printable substrates. Additional challenges and difficulties associated with printing on paper towel substrates are described in U.S. Pat. No. 6,993,964.

Figure 13:
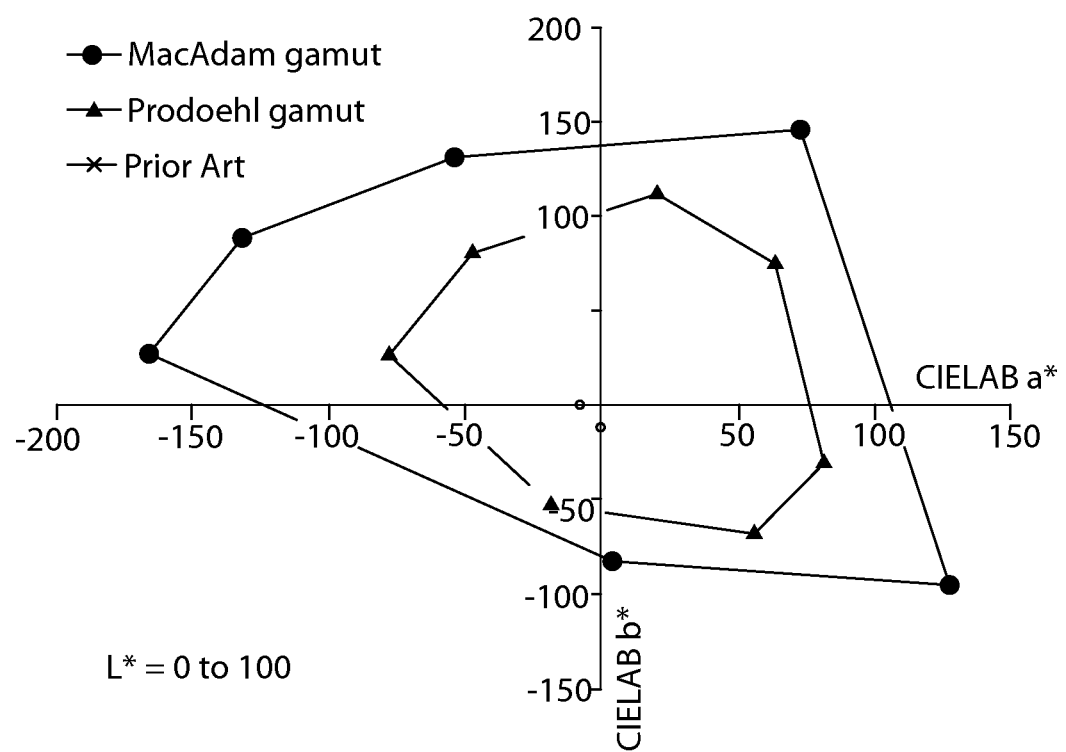
FIG. 13 is a graphical representation of exemplary extrapolated MacAdam and Prodoehl 2-D color gamuts in CIELab (L*a*b*) coordinates showing the a*b* plane where L*=0 to 100.

FIG. 13 shows an exemplary extrapolated graphical representation of the 2-dimensional (2-D) color gamut available to the MacAdam 2-D color gamut (the maximum 2-D theoretical human color perception) or the Prodoehl 2-D color gamut (the preferred 2-D surface color gamut) as applied to web substrates of the present disclosure such as absorbent paper products by the central roll, such as gravure cylinder 200, of the present disclosure when described in $L^*a^*b^*$ space. FIGS. 14-17 depict the 3-D color gamuts available for application to web substrates of the present disclosure such as absorbent paper products by the central roll, such as gravure cylinder 200, of the present disclosure when described in $L^*a^*b^*$ space.

As described supra, it is observed that a product having the herein described increased color gamut are more visually perceptible when compared to products limited by the prior art gamut. This can be particularly true for absorbent paper products using the herein described gamuts. Without desiring to be bound by theory, this can be because there are more visually perceptible colors in the gamuts of the present disclosure. It is surprisingly noticed that the present invention also provides products having a full color scale with no loss in gamut.

The color gamut boundaries in both 2-D CIELab ($L^*a^*b^*$) space and 3-D CIELab ($L^*a^*b^*$) space capable of being produced by the apparatus of the present disclosure may be approximated by the following system of 2-dimensional equations (FIG. 13) and 3-dimensional equations FIGS. 14-17) in CIELab coordinates ($L^*a^*b$) respectively:

MacAdam 2-D Color Gamut (FIG. 13)

$\{a^*=-54.1$ to $72.7$; $b^*=131.5$ to $145.8\} \rightarrow b^*=0.113 a^*+137.6$ $\{a^*=-131.6$ to $-54.1$; $b^*=89.1$ to $131.5\} \rightarrow b^*=0.547 a^*+161.1$ $\{a^*=-165.6$ to $-131.6$; $b^*=28.0$ to $89.1\} \rightarrow b^*=1.797 a^*+325.6$ $\{a^*=3.6$ to $-165.6$; $b^*=-82.6$ to $28.0\} \rightarrow b^*=-0.654 a^*-80.3$ $\{a^*=127.1$ to $3.6$; $b^*=-95.1$ to $-82.6\} \rightarrow b^*=-0.101 a^*-82.3$ $\{a^*=72.7$ to $127.1$; $b^*=145.8$ to $-95.1\} \rightarrow b^*=-4.428 a^*+467.7$ wherein $L^*$ is from 0 to 100.

Prodoehl 2-D Color Gamut (FIG. 13)

$\{a^*=20.0$ to $63.6$; $b^*=113.3$ to $75.8\} \rightarrow b^*=-0.860 a^*+130.50$ $\{a^*=-47.5$ to $20.0$; $b^*=82.3$ to $113.3\} \rightarrow b^*=0.459 a^*+104.11$ $\{a^*=-78.0$ to $-47.5$; $b^*=28.4$ to $82.3\} \rightarrow b^*=1.767 a^*+166.24$ $\{a^*=-18.8$ to $-78.0$; $b^*=-51.7$ to $28.4\} \rightarrow b^*=-1.353 a^*-77.14$ $\{a^*=56.6$ to $-18.8$; $b^*=-67.4$ to $-51.7\} \rightarrow b^*=-0.208 a^*-55.61$ $\{a^*=81.8$ to $56.6$; $b^*=-29.8$ to $-67.4\} \rightarrow b^*=1.492 a^*-151.85$ $\{a^*=63.6$ to $81.8$; $b^*=75.8$ to $-29.8\} \rightarrow b^*=-5.802 a^*+444.82$ wherein $L^*$ is from 0 to 100.

Figure 14:
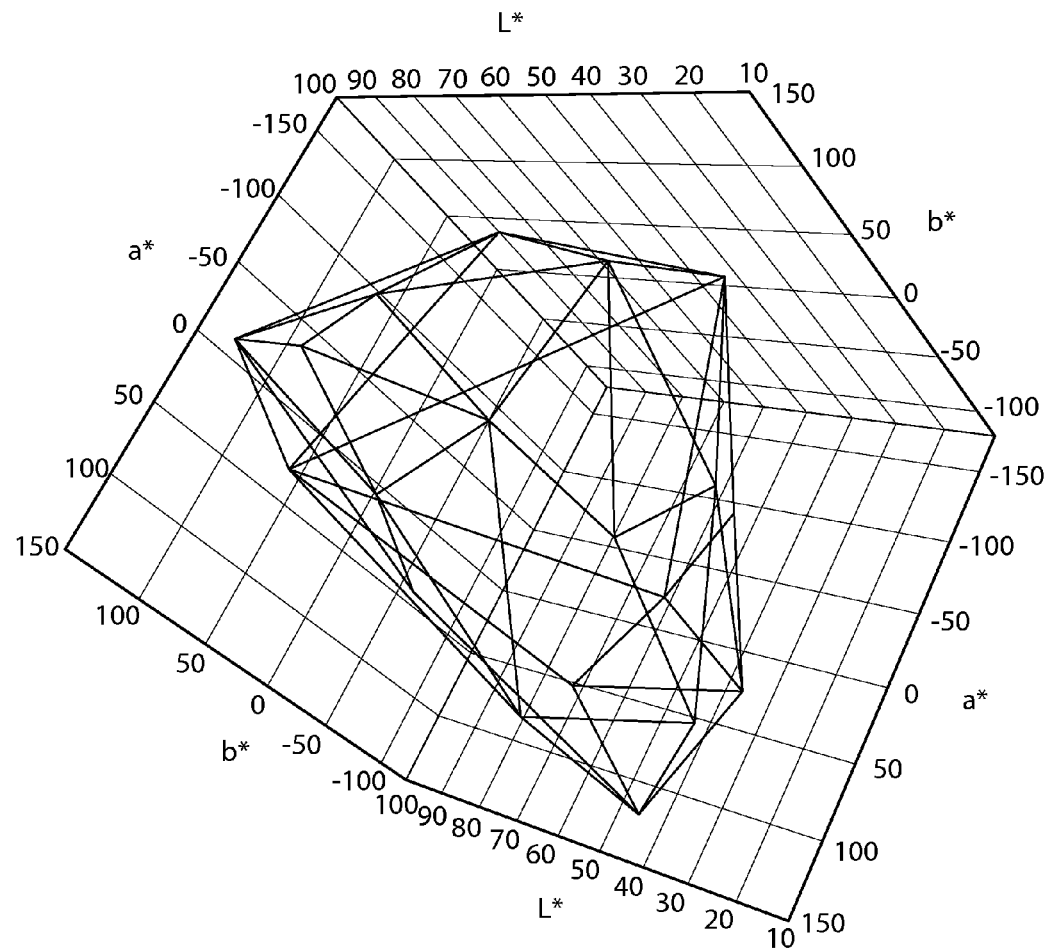
FIG. 14 is a graphical representation of exemplary extrapolated MacAdam 3-D color gamut in CIELab (L*a*b*) coordinates.
Figure 15:
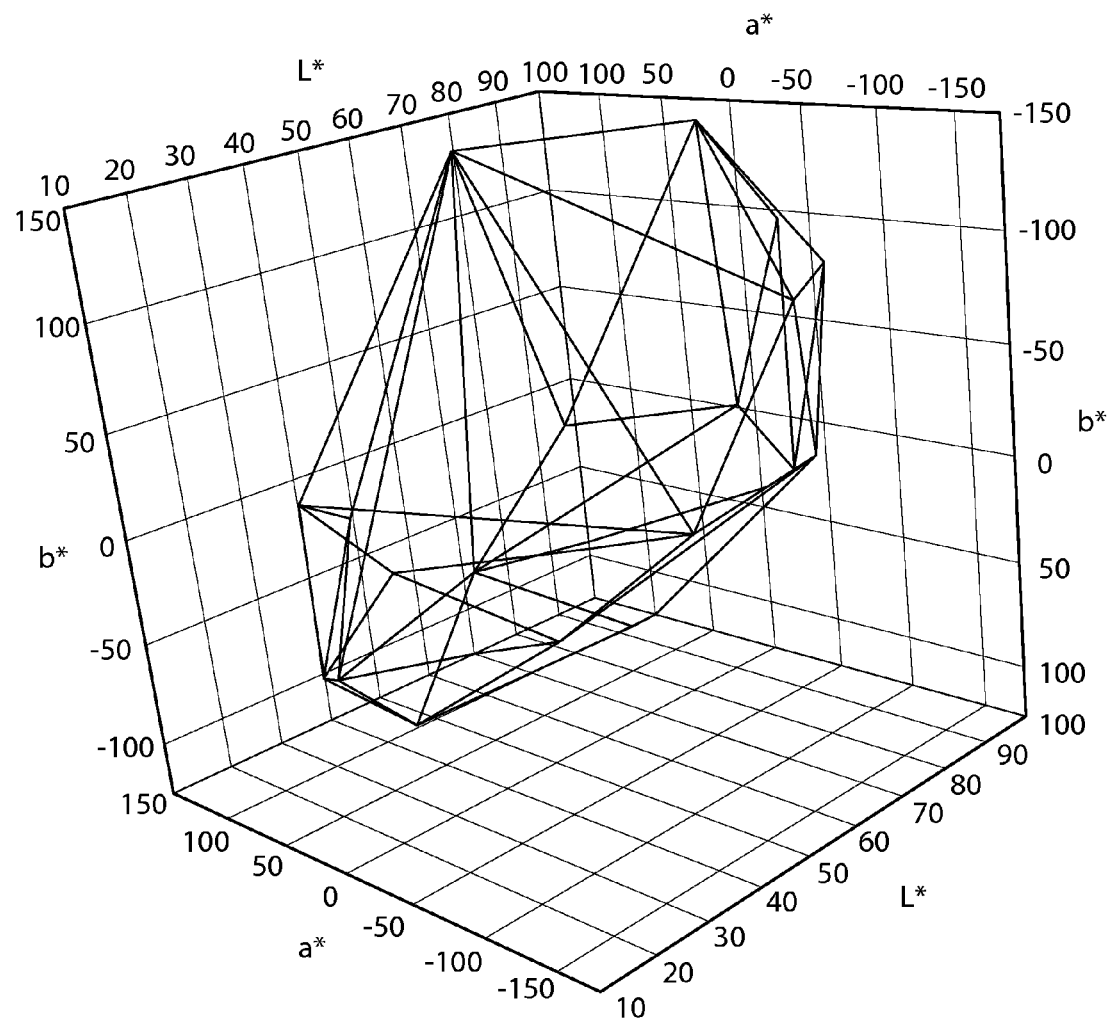
FIG. 15 is an alternative graphical representation of exemplary extrapolated MacAdam 3-D color gamut in CIELab (L*a*b*) coordinates.

MacAdam 3-D Color Gamut (FIGS. 14-15)

| Vertexes defining each Face ||||||||| $E a^* + F b^* + G L^* + H = 0$ ||||
|---|---|---|---|---|---|---|---|---|---|---|---|---|
| Vertex 1 ||| Vertex 2 ||| Vertex 3 ||| |||| 
| z1 | x1 | y1 | z2 | x2 | y2 | z3 | x3 | y3 | Face Plane Equation Coefficients ||||
| $L^*$ | $a^*$ | $b^*$ | $L^*$ | $a^*$ | $b^*$ | $L^*$ | $a^*$ | $b^*$ | E | F | G | H |
| 20 | 41.6 | 24 | 20 | −24.6 | 4.3 | 20 | 48.9 | −58.2 | 0.0 | 0.0 | 5585.5 | −111709.0 |
| 20 | 41.6 | 24 | 20 | −24.6 | 4.3 | 37.8 | −162 | 25 | −350.7 | 1178.4 | −4077.1 | 67849.2 |
| 20 | 41.6 | 24 | 20 | 48.9 | −58.2 | 37.8 | 92.4 | −8.8 | −1463.2 | −129.9 | 3936.3 | −14740.4 |
| 20 | 41.6 | 24 | 37.8 | 92.4 | −8.8 | 61.7 | 72.7 | 146 | −3535.8 | −1564.8 | 7207.5 | 40493.6 |

-continued

| Vertexes defining each Face | | | | | | | | | E a* + F b* + G L* + H = 0 | | | |
|---|---|---|---|---|---|---|---|---|---|---|---|---|
| Vertex 1 | | | Vertex 2 | | | Vertex 3 | | | | | | |
| z1 | x1 | y1 | z2 | x2 | y2 | z3 | x3 | y3 | Face Plane Equation Coefficients | | | |
| L* | a* | b* | L* | a* | b* | L* | a* | b* | E | F | G | H |
| 20 | 41.6 | 24 | 37.8 | −162 | 25 | 61.7 | 72.7 | 146 | −2126.3 | 9043.7 | −24829.6 | 367998.5 |
| 20 | −24.6 | 4.3 | 20 | 48.9 | −58.2 | 37.8 | −63 | −38.1 | −1112.5 | −1308.3 | −5516.4 | 88586.2 |
| 20 | −24.6 | 4.3 | 37.8 | −63 | −38.1 | 37.8 | −162 | 25 | −1123.2 | −1762.2 | −6620.6 | 112360.0 |
| 20 | 48.9 | −58.2 | 37.8 | 92.4 | −8.8 | 37.8 | 127 | −95.1 | 1536.1 | 617.7 | −5468.2 | 70195.2 |
| 20 | 48.9 | −58.2 | 37.8 | 127 | −95.1 | 37.8 | 60.8 | −105 | 181.6 | −1180.1 | −3244.1 | −12680.2 |
| 20 | 48.9 | −58.2 | 37.8 | 60.8 | −105 | 37.8 | −63 | −38.1 | −1196.2 | −2203.6 | −5031.3 | 30866.4 |
| 37.8 | 92.4 | −8.8 | 37.8 | 127 | −95.1 | 61.7 | 72.7 | 146 | −2062.6 | −829.3 | 3664.5 | 44764.9 |
| 37.8 | 127 | −95.1 | 37.8 | 60.8 | −105 | 61.7 | 102 | −63 | −243.8 | 1584.6 | −2385.3 | 271840.3 |
| 37.8 | 127 | −95.1 | 61.7 | 72.7 | 146 | 61.7 | 102 | −63 | 4990.3 | 697.9 | 4324.2 | −731365.1 |
| 37.8 | 60.8 | −105 | 37.8 | −63 | −38.1 | 61.7 | −30.2 | −66 | 1606.1 | 2958.8 | 1249.9 | 166669.4 |
| 37.8 | 60.8 | −105 | 61.7 | 102 | −63 | 61.7 | −30.2 | −66 | 71.7 | −3157.2 | 5464.5 | −543370.7 |
| 37.8 | −63 | −38.1 | 37.8 | −162 | 25 | 61.7 | −161 | 33.4 | 1508.1 | 2366.1 | −888.4 | 218739.2 |
| 37.8 | −63 | −38.1 | 61.7 | −161 | 33.4 | 61.7 | −30.2 | −66 | 2375.7 | 3128.5 | 391.8 | 254053.1 |
| 37.8 | −162 | 25 | 61.7 | −161 | 33.4 | 69.5 | −132 | 89.1 | −1265.7 | 698.0 | −197.7 | −215023.8 |
| 37.8 | −162 | 25 | 69.5 | −132 | 89.1 | 61.7 | 72.7 | 146 | −2297.4 | 6713.4 | −11372.0 | −110150.0 |
| 61.7 | −161 | 33.4 | 69.5 | −132 | 89.1 | 91.7 | −83.2 | 85.3 | 1266.2 | −277.4 | −2808.0 | 386498.5 |
| 61.7 | −161 | 33.4 | 91.7 | −83.2 | 85.3 | 87 | −67.3 | −13.3 | 2714.1 | 843.1 | −8506.2 | 933905.6 |
| 61.7 | −161 | 33.4 | 87 | −67.3 | −13.3 | 61.7 | −30.2 | −66 | 2514.8 | 3311.8 | −3210.7 | 492624.0 |
| 69.5 | −132 | 89.1 | 91.7 | −83.2 | 85.3 | 91.7 | −1.2 | 145 | −1332.0 | 1820.4 | 3215.6 | −560973.0 |
| 69.5 | −132 | 89.1 | 91.7 | −1.2 | 145 | 61.7 | 72.7 | 146 | −1697.1 | 5552.6 | −4088.0 | −433958.6 |
| 91.7 | −83.2 | 85.3 | 91.7 | −1.2 | 145 | 98 | −33.9 | 95.7 | 378.6 | −516.6 | −2105.2 | 268562.4 |
| 91.7 | −83.2 | 85.3 | 98 | −33.9 | 95.7 | 87 | −67.3 | −13.3 | 572.3 | 331.9 | −5026.3 | 480221.4 |
| 91.7 | −1.2 | 145 | 98 | −33.9 | 95.7 | 98 | 8.3 | 3.3 | 582.1 | 265.9 | 5114.6 | −506939.7 |
| 91.7 | −1.2 | 145 | 61.7 | 72.7 | 146 | 76.1 | 67.7 | 4.6 | −4228.8 | −914.2 | −10432.2 | 1084383.8 |
| 91.7 | −1.2 | 145 | 76.1 | 67.7 | 4.6 | 98 | 8.3 | 3.3 | −3101.6 | −582.3 | −8447.2 | 855485.6 |
| 98 | −33.9 | 95.7 | 87 | −67.3 | −13.3 | 98 | 8.3 | 3.3 | −1016.4 | −464.2 | 7686.0 | −743256.1 |
| 87 | −67.3 | −13.3 | 61.7 | 102 | −63 | 98 | 8.3 | 3.3 | −126.7 | −3773.9 | 6566.0 | −629966.3 |
| 87 | −67.3 | −13.3 | 61.7 | 102 | −63 | 61.7 | −30.2 | −66 | −75.9 | 3342.1 | −7073.0 | 654690.6 |
| 61.7 | 72.7 | 146 | 61.7 | 102 | −63 | 76.1 | 67.7 | 4.6 | −3006.7 | −420.5 | −5167.0 | 598700.9 |
| 61.7 | 102 | −63 | 76.1 | 67.7 | 4.6 | 98 | 8.3 | 3.3 | 1499.2 | −106.4 | 4059.9 | −409962.2 |

Figure 16:
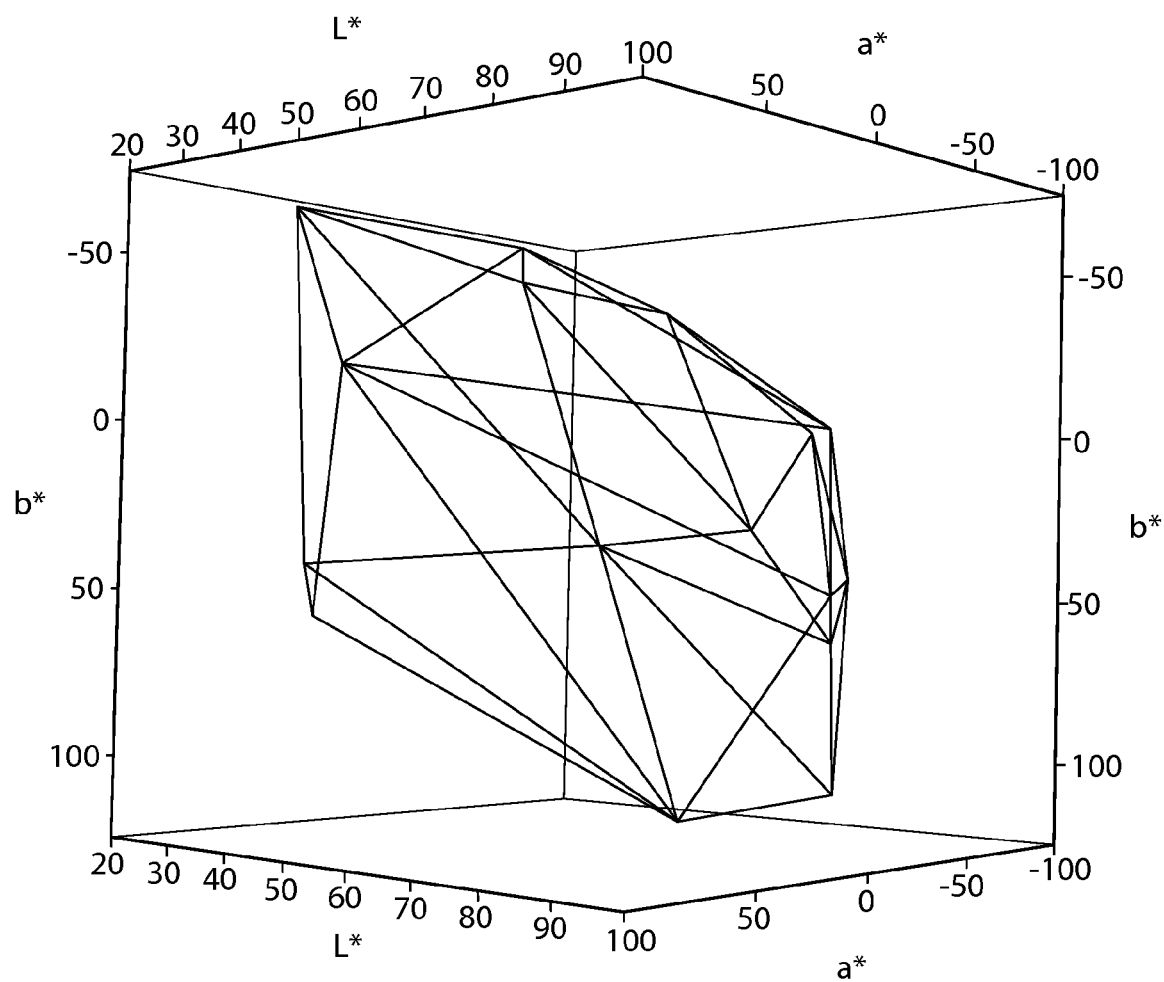
FIG. 16 is a graphical representation of exemplary extrapolated Prodoehl 3-D color gamut in CIELab (L*a*b*) coordinates; and, FIG. 17 is an alternative graphical representation of exemplary extrapolated Prodoehl 3-D color gamut in CIELab (L*a*b*) coordinates.
Figure 17:
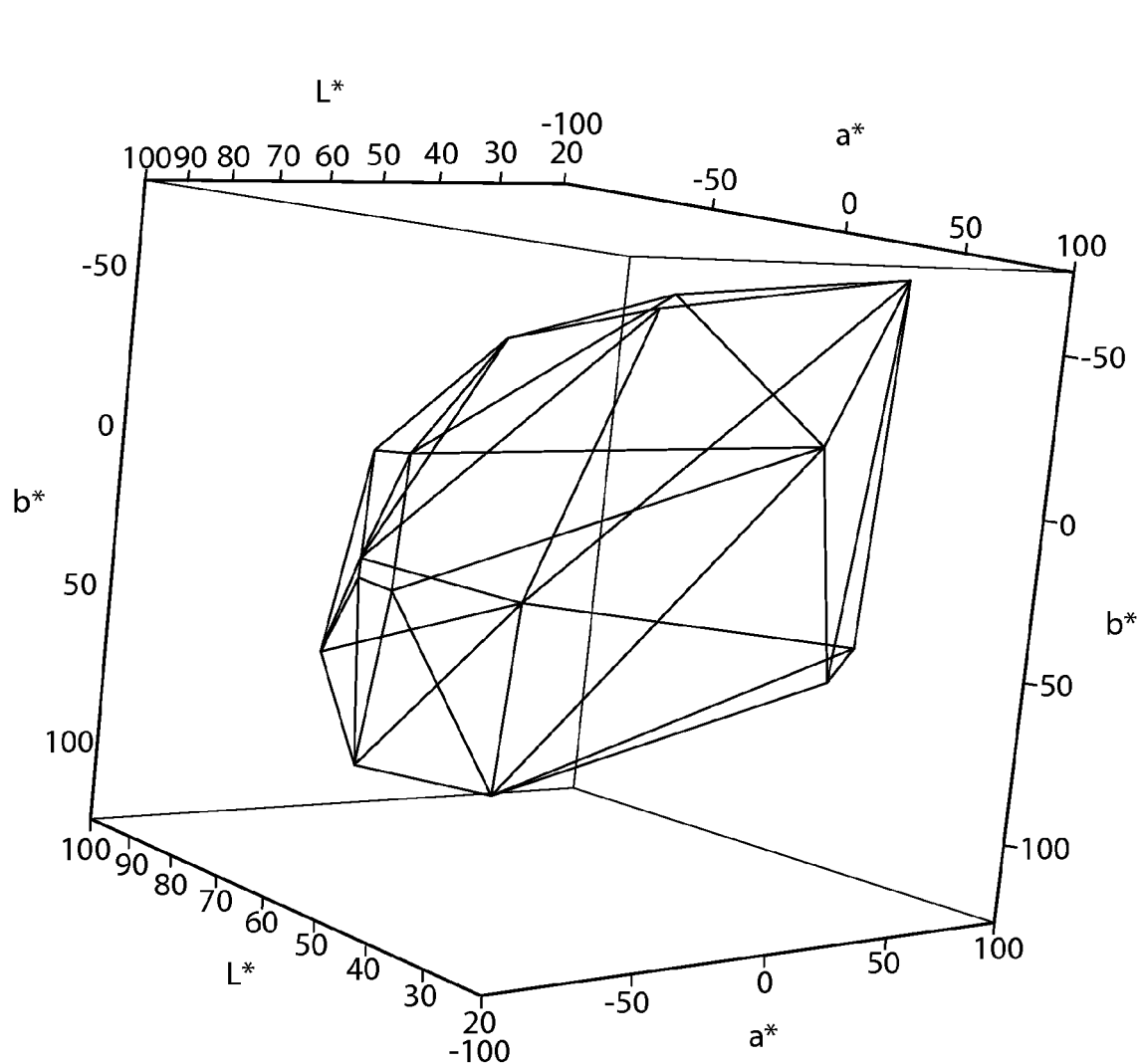

Prodoehl 3-D Color Gamut (FIGS. 16-17)

| Vertexes defining each Face | | | | | | | | | E a* + F b* + G L* + H = 0 | | | |
|---|---|---|---|---|---|---|---|---|---|---|---|---|
| Vertex 1 | | | Vertex 2 | | | Vertex 3 | | | | | | |
| z1 | x1 | y1 | z2 | x2 | y2 | z3 | x3 | y3 | Face Plane Equation Coefficients | | | |
| L* | a* | b* | L* | a* | b* | L* | a* | b* | E | F | G | H |
| 30 | 56.6 | −67.4 | 30 | 50.6 | 42.4 | 40 | −58.9 | 34 | 1098.0 | 60.0 | 12073.5 | −420307.8 |
| 30 | 56.6 | −67.4 | 30 | 50.6 | 42.4 | 40 | 68.9 | 57.9 | 1098.0 | 60.0 | −2102.3 | 4967.4 |
| 30 | 56.6 | −67.4 | 40 | −58.9 | 34 | 40 | −18.5 | −50.7 | 847.0 | 404.0 | 5686.3 | −191299.3 |
| 30 | 56.6 | −67.4 | 40 | 68.9 | 57.9 | 50 | 82.7 | −14.6 | 1978.0 | 15.0 | −2620.9 | −32317.1 |
| 30 | 56.6 | −67.4 | 40 | −18.5 | −50.7 | 50 | 9.9 | −56.1 | 221.0 | 1035.0 | −68.7 | 59312.6 |
| 30 | 56.6 | −67.4 | 40 | 82.7 | −14.6 | 50 | 9.9 | −56.1 | 830.0 | −1456.0 | 2760.7 | −227933.1 |
| 30 | 50.6 | 42.4 | 40 | −58.9 | 34 | 80 | 20 | 113 | −1129.0 | 5169.0 | −8020.6 | 78579.5 |
| 30 | 50.6 | 42.4 | 40 | 68.9 | 57.9 | 80 | 20 | 113 | 66.0 | −1221.0 | 1771.8 | −4722.3 |
| 40 | −58.9 | 34 | 80 | 20 | 113 | 90 | −18.8 | 106 | 1069.0 | −2341.0 | 2532.4 | 41260.9 |
| 40 | −58.9 | 34 | 40 | −18.5 | −50.7 | 60 | −78 | 28.4 | −1694.0 | −808.0 | −1844.0 | 1455.8 |
| 40 | −58.9 | 34 | 60 | −78 | 28.4 | 80 | −54 | 64.3 | −830.0 | 862.0 | −551.3 | −56143.4 |
| 40 | −58.9 | 34 | 90 | −18.8 | 106 | 80 | −54 | 64.3 | 1381.0 | −1359.0 | 860.3 | 93136.1 |
| 40 | 68.9 | 57.9 | 80 | 20 | 113 | 50 | 82.7 | −14.6 | 3454.0 | 1041.0 | 2780.7 | −409483.7 |
| 80 | 20 | 113 | 50 | 82.7 | −14.6 | 93.1 | −5.6 | 48.8 | −3610.5 | −53.4 | −7318.5 | 663727.8 |
| 80 | 20 | 113 | 93.1 | −5.6 | 48.8 | 90 | −18.8 | 106 | −554.6 | −252.3 | −2326.0 | 225752.3 |
| 40 | −18.5 | −50.7 | 60 | −78 | 28.4 | 60 | −32.1 | −38.3 | 1334.0 | 918.0 | 338.0 | 57703.2 |
| 40 | −18.5 | −50.7 | 50 | 9.9 | −56.1 | 60 | −32.1 | −38.3 | −232.0 | −704.0 | 278.7 | −51133.6 |
| 60 | −78 | 28.4 | 60 | −32.1 | −38.3 | 80 | −41 | 0 | −1334.0 | −918.0 | 1164.5 | −147841.2 |
| 60 | −78 | 28.4 | 80 | −41 | 0 | 80 | −54 | 64.3 | −1286.0 | −260.0 | 2009.9 | −213518.0 |
| 50 | 82.7 | −14.6 | 94.3 | −0.3 | 2 | 50 | 9.9 | −56.1 | 1838.5 | −3225.0 | 4653.0 | −431774.4 |
| 50 | 82.7 | −14.6 | 94.3 | −0.3 | 2 | 93.1 | −5.6 | 48.8 | −2093.2 | −334.4 | −3796.4 | 358043.2 |
| 94.3 | −0.3 | 2 | 50 | 9.9 | −56.1 | 60 | −32.1 | −38.3 | 207.5 | 1758.6 | −2258.6 | 209534.8 |
| 94.3 | −0.3 | 2 | 60 | −32.1 | −38.3 | 80 | −41 | 0 | 507.7 | 941.3 | −1576.6 | 146944.1 |
| 94.3 | −0.3 | 2 | 80 | −41 | 0 | 90 | −25 | 43.3 | 599.2 | 178.2 | −1730.3 | 162991.6 |
| 94.3 | −0.3 | 2 | 90 | −25 | 43.3 | 93.1 | −5.6 | 48.8 | 151.7 | −6.9 | −937.1 | 88424.9 |
| 80 | −41 | 0 | 90 | −25 | 43.3 | 80 | −54 | 64.3 | −643.0 | −130.0 | 1591.7 | −153699.0 |

-continued

| Vertexes defining each Face | | | | | | | | | $E a^* + F b^* + G L^* + H = 0$ | | | |
|---|---|---|---|---|---|---|---|---|---|---|---|---|
| Vertex 1 | | | Vertex 2 | | | Vertex 3 | | | Face Plane Equation Coefficients | | | |
| z1 | x1 | y1 | z2 | x2 | y2 | z3 | x3 | y3 | | | | |
| L* | a* | b* | L* | a* | b* | L* | a* | b* | E | F | G | H |
| 90 | −25 | 43.3 | 93.1 | −5.6 | 48.8 | 90 | −18.8 | 106 | −195.6 | 19.2 | 1190.0 | −112826.1 |
| 90 | −25 | 43.3 | 90 | −18.8 | 106 | 80 | −54 | 64.3 | −631.0 | 62.0 | 1960.1 | −194868.6 |

Test Methods

1. Basis Weight Method

Basis weight is measured by preparing one or more samples of a certain area (m$^2$) and weighing the sample(s) of a fibrous structure according to the present invention on a top loading balance with a minimum resolution of 0.01 g. The balance is protected from air drafts and other disturbances using a draft shield. Weights are recorded when the readings on the balance become constant. The average weight (g) is calculated and the average area of the samples (m$^2$). The basis weight (g/m$^2$) is calculated by dividing the average weight (g) by the average area of the samples (m$^2$). This method is herein referred to as the Basis Weight Method.

2. Tensile Modulus Test

Tensile Modulus of tissue samples may be obtained at the same time as the tensile strength of the sample is determined. In this method a single ply 10.16 cm wide sample is placed in a tensile tester (Thwing Albert QCII interfaced to an LMS data system) with a gauge length of 5.08 cm. The sample is elongated at a rate of 2.54 cm/minute. The sample elongation is recorded when the load reaches 10 g/cm ($F_{10}$), 15 g/cm ($F_{15}$), and 20 g/cm ($F_{20}$). A tangent slope is then calculated with the mid-point being the elongation at 15 g/cm ($F_{15}$).

Total Tensile Modulus is obtained by measuring the Tensile Modulus in the machine direction at 15 g1cm and cross machine direction at 15 g/cm and then calculating the geometric mean. Mathematically, this is the square root of the product of the machine direction Tensile Modulus (TenMod15MD) and the cross direction Tensile Modulus (TenMod15CD).

$$\text{Total Tensile Modulus} = (\text{TenMod15}MD \times \text{TenMod15}CD)^{1/2}$$

One of skill in the art will appreciate that relatively high values for Total Tensile Modulus indicate that the sample is stiff and rigid.

3. Print Resolution Test Method

Print resolution is the number of ink dots per linear inch. Place the printed sample under a microscope of sufficient magnification power to distinguish individual ink dots. Place a ruler with fine gradations over the printed sample. Count the number of ink dots that traverse a lineal inch. Repeat this at ten areas on the sample. Take the arithmetic mean of the ten measurements to determine the average print resolution. Print resolution is reported in units of dots per inch (dpi).

4. Color Test Method

CIELab (L*a*b*) values of a finally printed product produced according to the present disclosure discussed herein can be measured with a colorimeter, spectrophotometer, or spectrodensitometer according to ISO 13655. A suitable spectrodensitometer for use with this invention is the X-Rite 530 commercially available from X-Rite, Inc. of Grand Rapids, Mich.

Select the D50 illuminant and 2 degree observer as described. Use 45/0° measurement geometry. The spectrodensitometer should have a 10 nm measurement interval. The spectrodensitometer should have a measurement aperture of less than 2 mm. Before taking color measurements, calibrate the spectrodensitometer according to manufacturer instructions. Visible surfaces are tested in a dry state and at an ambient relative humidity of approximately 50%±2% and a temperature of 23° C.±1° C. Place the sample to be measured on a white backing that meets ISO 13655 section A3 specifications. Exemplary white backings are described on the web site: http://www.fogra.de/en/fogra-standardization/fogra-characterizationdata/information-about-measurement-backings/. Select a sample location on the visible surface of the printed product containing the color to be analyzed. The L*, a*, and b* values are read and recorded.

All publications, patent applications, and issued patents mentioned herein are hereby incorporated in their entirety by reference. Citation of any reference is not an admission regarding any determination as to its availability as prior art to the claimed invention.

The dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A contact printing system comprising:
a gravure roll comprising:
   a plurality of discrete cells disposed upon an outer surface of said gravure roll, and
   fluid delivery channels,
wherein each of said plurality of discrete cells are in fluidic communication with a respective one of said fluid delivery channels,
wherein said gravure roll, including each of said fluid delivery channels and said plurality of discrete cells, is formed such that said gravure roll has a unibody construction,
wherein there are no moving parts interior to said gravure roll, and
wherein said plurality of discrete cells provide a halftoning of greater than about 20 dpi print resolution.

2. The contact printing system of claim 1 wherein each of said fluid delivery channels being capable of providing fluid communication between a fluid disposed external to said gravure roll and at least one of said plurality of discrete cells at a location internal to said gravure roll.

3. The contact printing system of claim 2 wherein each of said respective fluid delivery channels is disposed internal to said gravure roll.

4. The contact printing system of claim 3 wherein each of said respective fluid delivery channels are in fluid communication with said at least one of said plurality of discrete cells at a location internal to said gravure roll.

5. The contact printing system of claim 1 wherein each of said respective fluid delivery channels are disposed internal to said gravure roll.

6. The contact printing system of claim 1 wherein said gravure roll is formed in situ, and said in situ formation is selected from the group consisting of SLA/stereo lithography, SLM/Selective Laser Melting, RFP/Rapid freeze prototyping, SLS/Selective Laser sintering, SLA/Stereo lithography, EFAB/Electrochemical fabrication, DMDS/Direct Metal Laser Sintering, LENS.RTM./Laser Engineered Net Shaping, DPS/Direct Photo Shaping, DLP/Digital light processing, EBM/Electron beam machining, FDM/Fused deposition manufacturing, MJM/Multiphase jet modeling, LOM/Laminated Object manufacturing, DMD/Direct metal deposition, SGC/Solid ground curing, JFP/Jetted photo polymer, EBF/Electron Beam Fabrication, LMJP/liquid metal jet printing, MSDM/Mold shape deposition manufacturing, SALD/Selective area laser deposition, SDM/Shape deposition manufacturing, and combinations thereof.

7. The contact printing system of claim 1 wherein said gravure roll is cast.

8. The contact printing system of claim 7 wherein said gravure roll is cast using an inverse roll.

9. The contact printing system of claim 1 wherein inverse fluid delivery channels corresponding to the fluid delivery channels are fabricated and said gravure roll, including said plurality of discrete cells, is cast around said inverse fluid delivery channels.

10. The contact printing system of claim 9 wherein said inverse fluid delivery channels are fabricated from a soluble material.

11. The contact printing system of claim 10 wherein said soluble material is removed after said fabrication of said gravure roll which includes said plurality of discrete cells.

12. The contract printing system of claim 1 wherein at least one of said fluid delivery channels are fabricated in situ as a manifold, said manifold being in fluid communication with at least two of said plurality of discrete cells.

13. The contact printing system of claim 12 wherein said at least two of said plurality of discrete cells are not adjacent each other upon said surface of said gravure roll.

14. The contact printing system of claim 12 wherein a first ink distribution channel provides fluid communication between said manifold and one of said at least two of said plurality of discrete cells.

* * * * *

UNITED STATES PATENT AND TRADEMARK OFFICE
CERTIFICATE OF CORRECTION

PATENT NO. : 8,616,126 B2
APPLICATION NO. : 13/040311
DATED : December 31, 2013
INVENTOR(S) : Thomas Timothy Byrne et al.

It is certified that error appears in the above-identified patent and that said Letters Patent is hereby corrected as shown below:

In the Claims

Claim 6, Column 29, Line 22, delete "LENS.RTM./Laser" and insert -- LENS®/Laser --.

Claim 12, Column 30, Line 18, delete "contract" and insert -- contact --.

Signed and Sealed this
Fourth Day of March, 2014

Michelle K. Lee
*Deputy Director of the United States Patent and Trademark Office*